(12) United States Patent
Dryburgh et al.

(10) Patent No.: US 6,209,956 B1
(45) Date of Patent: *Apr. 3, 2001

(54) SEATING UNIT

(75) Inventors: Ian Dryburgh, Nr. Winchester; Simon Lunn; Russel Mulchansingh, both of London, all of (GB)

(73) Assignee: British Airways PLC (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,055

(22) Filed: Oct. 29, 1998

Related U.S. Application Data

(62) Division of application No. 09/097,149, filed on Jun. 12, 1998, now Pat. No. 6,059,364, which is a continuation of application No. 08/529,818, filed on Sep. 18, 1995, now abandoned.

(51) Int. Cl.[7] ................................................. A47C 15/00
(52) U.S. Cl. .................. 297/245; 297/354.13; 297/233; 297/67; 244/118.6
(58) Field of Search ....................... 297/342, 343, 297/354.13, 68, 64, 65, 67, 69, 188.04, 147, 233, 245; 5/18.1, 9.1; 244/118.6, 118.5; 105/315, 323, 327, 316

(56) References Cited

U.S. PATENT DOCUMENTS

| D. 138,511 | 8/1944 | Dreyfuss . |
| D. 182,880 | 5/1958 | Diffrient . |
| D. 215,597 | 10/1969 | Rich . |
| D. 252,060 | 6/1979 | Prevost . |
| D. 262,165 | 12/1981 | Andries et al. . |
| D. 273,157 | 3/1984 | Staub . |

(List continued on next page.)

FOREIGN PATENT DOCUMENTS

| 714 911 | 11/1941 | (DE) . |
| 29 32 251 A1 | 2/1981 | (DE) . |
| 37 19 105 A1 | 12/1988 | (DE) . |
| 40 39 100 | 6/1992 | (DE) . |

(List continued on next page.)

OTHER PUBLICATIONS

"The Albatross Nightrider", in *The de Havilland Gazette* No. 20 Dec. 1938, published by The de Havilland Aircraft Co., Ltd, Hatfield, Herts., England.
"The Aeroplane", Nov. 16, 1938, p. 65.
*Proc. I. Mech. E. Part F: Journal of Rail and Rapid Transit*, vol. 206 (1992) pp. 1–11.
*Modern Railways*, vol. 46, No. 493 (Oct. 1989), pp. 513–515, 517–520, 543–544.
*Railway Magazine*, Nov. 1989, pp. 722–723 & Suppl. pp. I–VII.

(List continued on next page.)

*Primary Examiner*—Anthony D Barfield
(74) *Attorney, Agent, or Firm*—Sterne, Kessler, Goldstein & Fox, P.L.L.C.

(57) ABSTRACT

A seating unit (1) comprises a fixed housing (10) containing a primary seat with a reclinable back arranged to recline in such a manner that it remains within the housing. The seating unit is suitable for a aircraft cabin and may further comprise a leg-rest arranged to cooperate with the seating portion to form part of a substantially flat surface when the back is reclined in a substantially horizontal position. The seating unit may further comprise a secondary seat (3) positioned to face the primary seat, the secondary seat having a seating portion positioned to cooperate with the leg-rest of the primary seat to form a portion of the substantially flat surface when the back of the primary seat is reclined in the substantially horizontal position. Privacy between seats and use of available space within an aircraft cabin may be optimised by arranging at least some of the seats in an echelon.

54 Claims, 17 Drawing Sheets

U.S. PATENT DOCUMENTS

| | | |
|---|---|---|
| 1,759,800 | 5/1930 | Noack . |
| 1,879,673 | 9/1932 | Fischer . |
| 1,902,631 | 3/1933 | Flintermann . |
| 2,081,529 | 5/1937 | Canney . |
| 2,124,003 | 7/1938 | McDonnell et al. . |
| 2,320,614 | 6/1943 | Kleine . |
| 2,332,841 | 10/1943 | Burton et al. . |
| 2,348,407 | 5/1944 | O'Neill . |
| 2,608,366 | 8/1952 | Jergenson . |
| 2,947,349 | 8/1960 | Kryter . |
| 3,184,766 | 5/1965 | Mortrude . |
| 3,898,704 | 8/1975 | Gallaher et al. . |
| 3,934,927 | 1/1976 | Zur . |
| 3,936,093 | 2/1976 | Hogan . |
| 3,958,827 | 5/1976 | Ré . |
| 3,964,785 | 6/1976 | Plume . |
| 3,968,992 | 7/1976 | Hogan . |
| 4,018,166 * | 4/1977 | Gutridge et al. ................... 5/18.1 |
| 4,037,872 | 7/1977 | Quakenbush . |
| 4,065,174 | 12/1977 | Yokohama et al. . |
| 4,077,663 | 3/1978 | Cycowicz et al. . |
| 4,085,962 | 4/1978 | Wahls . |
| 4,136,907 | 1/1979 | Hermanns . |
| 4,153,292 | 5/1979 | White et al. . |
| 4,186,900 | 2/1980 | Mizelle . |
| 4,216,991 | 8/1980 | Holobaugh . |
| 4,216,992 | 8/1980 | Crum . |
| 4,226,468 | 10/1980 | Johnson . |
| 4,382,628 | 5/1983 | Palmgren . |
| 4,408,796 | 10/1983 | Mizelle . |
| 4,531,778 | 7/1985 | Rogers, Jr. . |
| 4,625,934 | 12/1986 | Ryan et al. . |
| 4,674,713 | 6/1987 | Ryan et al. . |
| 4,735,456 | 4/1988 | Haefelfinger . |
| 4,756,034 | 7/1988 | Stewart . |
| 4,866,795 | 9/1989 | Dahlqvist . |
| 4,936,620 | 6/1990 | Francois et al. . |
| 5,072,988 | 12/1991 | Plunk . |
| 5,082,324 | 1/1992 | Harada et al. . |
| 5,110,183 | 5/1992 | Jeanes, III ........................ 297/343 |
| 5,333,818 | 8/1994 | Brandt et al. . |
| 5,358,307 | 10/1994 | Shafer et al. . |
| 5,402,544 * | 4/1995 | Crawford et al. ............. 297/354.13 |

FOREIGN PATENT DOCUMENTS

| | | |
|---|---|---|
| 40 39 100 A1 | 6/1992 | (DE) . |
| 0 126 056 A1 | 11/1984 | (EP) . |
| 0 248 373 A2 | 12/1987 | (EP) . |
| 0 291 894 A2 | 11/1988 | (EP) . |
| 0 335 018 A1 | 10/1989 | (EP) . |
| 0 346 299 A1 | 12/1989 | (EP) . |
| 0 463 757 A2 | 1/1992 | (EP) . |
| 0 463 757 A3 | 1/1992 | (EP) . |
| 0 639 479 A1 | 2/1995 | (EP) . |
| 350.043 | 8/1905 | (FR) . |
| 647.809 | 12/1928 | (FR) . |
| 245333 | 1/1926 | (GB) . |
| 446913 | 5/1936 | (GB) . |
| 494152 | 10/1938 | (GB) . |
| 593542 | 5/1946 | (GB) . |
| 589980 | 7/1947 | (GB) . |
| 809110 | 2/1959 | (GB) . |
| 830646 | 3/1960 | (GB) . |
| 907472 | 10/1962 | (GB) . |
| 1056648 | 1/1967 | (GB) . |
| 1278501 | 6/1972 | (GB) . |
| 1 284 706 | 8/1972 | (GB) . |
| 1420799 | 1/1976 | (GB) . |
| 1490825 | 11/1977 | (GB) . |
| 2 037 579 | 7/1980 | (GB) . |
| 2113536A | 8/1983 | (GB) . |
| 2 179 846 | 3/1987 | (GB) . |
| 2203633A | 10/1988 | (GB) . |
| 2215997A | 10/1989 | (GB) . |
| 2219736A | 12/1989 | (GB) . |
| 2 220 849 | 1/1990 | (GB) . |
| 2277440A | 11/1994 | (GB) . |
| 49-56762 | 6/1974 | (JP) . |
| 58-89429 | 5/1983 | (JP) . |
| 64-43209 | 2/1989 | (JP) . |
| 64-43210 | 2/1989 | (JP) . |
| 2-111311 | 4/1990 | (JP) . |
| 3-1837 | 1/1991 | (JP) . |
| 6-15556 | 3/1991 | (JP) . |
| 4-135924 | 5/1992 | (JP) . |
| 4-259403 | 9/1992 | (JP) . |
| 5-1337 | 1/1993 | (JP) . |
| 5-13838 | 2/1993 | (JP) . |
| 5-46543 | 6/1993 | (JP) . |
| 6-13594 | 2/1994 | (JP) . |
| 6-255592 | 9/1994 | (JP) . |
| 6-270895 | 9/1994 | (JP) . |
| 68181 | 4/1941 | (NO) . |

OTHER PUBLICATIONS

*Railway World*, vol. 50, No. 12 (Dec. 1989), pp. 752–754.
*Railway Gazette Internationa*, Nov. 1989, p. 831.
"State of the art: Passenger vehicle refurbishing" *Modern Railways*, vol. 50, No. 541 (Oct. 1993), pp. 603, 609 (excerpts).
"State of the art: Seating and Lighting", *Modern Railways*, vol. 51, No. 549 (Jun. 1994), pp. 360–364.
"The influence of engineering on the visual design of a high speed train", *Proc. I. Mech. E. Intl Conf: Rail Vehicles for Passengers* (Nov. 22–24, 1988) pp. 9–17.
Professional Pilot, Apr. 1981, p. 65 and other unknown page numbers.
Professional Pilot, Dec. 1979, p. 38 and another unknown page number.
Professional Pilot, May 1981, pp. 87 and 105.
Professional Pilot, Jan. 1981, p. 39.
Professional Pilot, Mar. 1980, pp. 62–63.
Professional Pilot, Jul. 1980, pp. 1 and 37.
inflight, Oct. 1994 (vol. 1, No. 1), p. 20 and another unknown page number.
14 illustrations cited in co–pending appl. No. 29/051,255; filed Mar. 7, 1996. Source and date unknown.
Domus, Jun. 1996, p. 29.

* cited by examiner

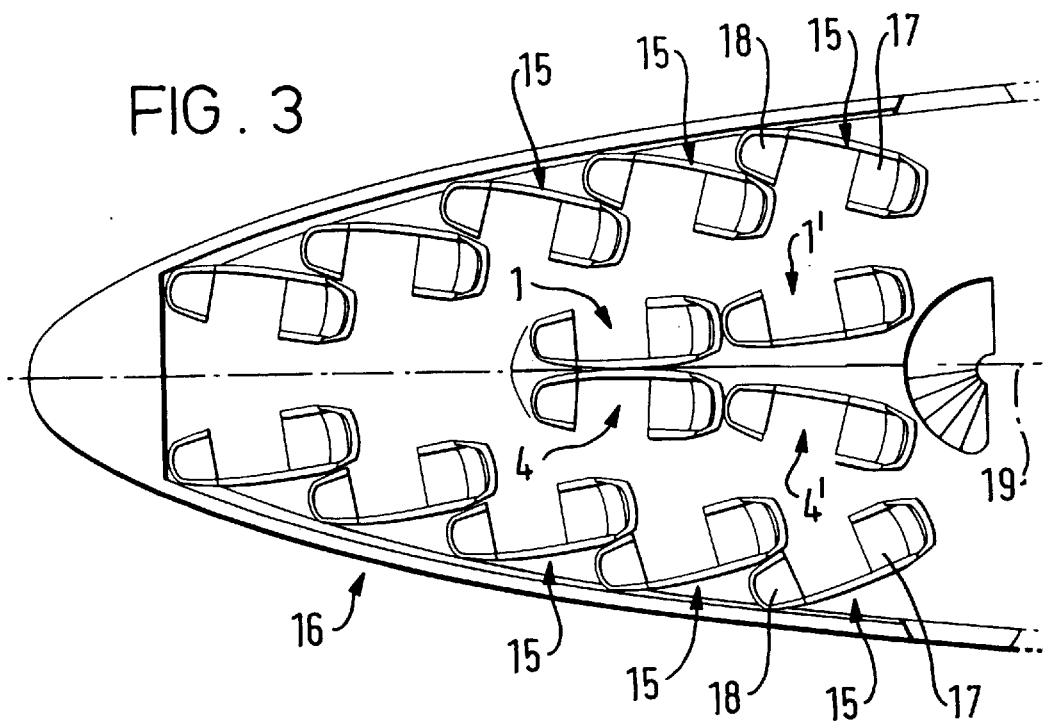
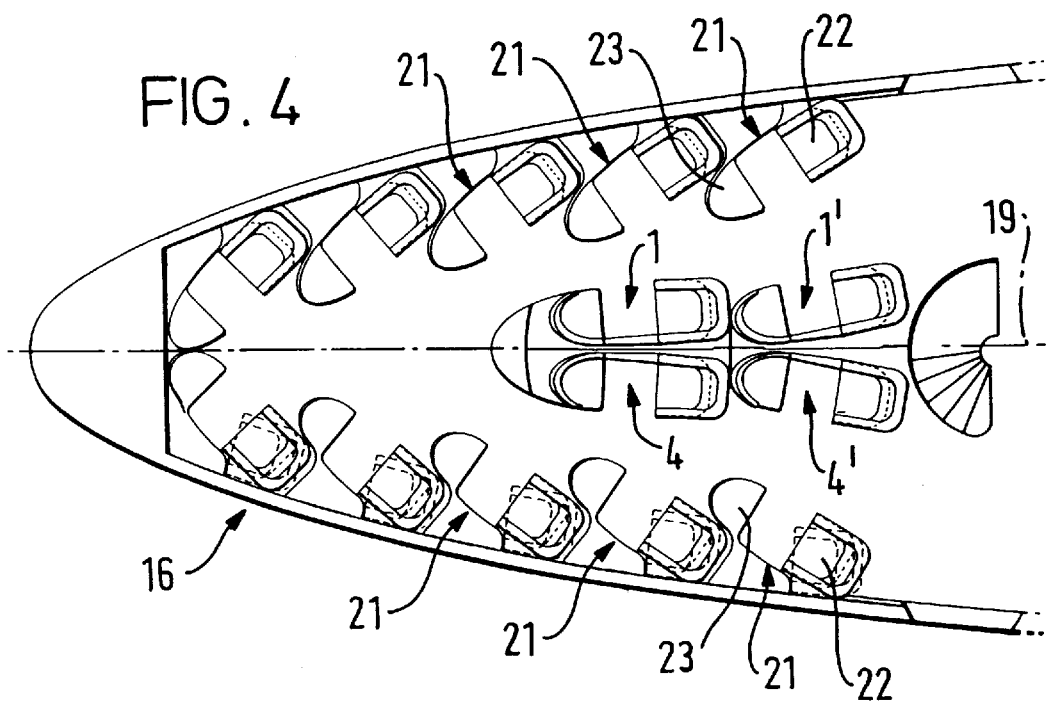

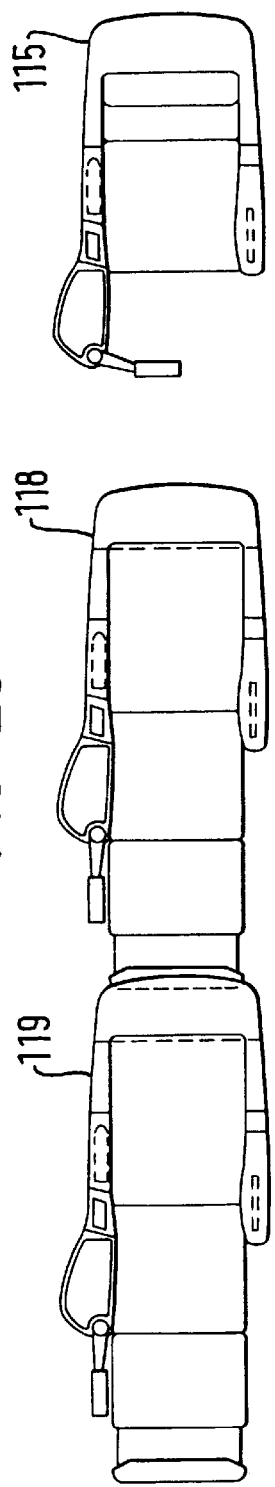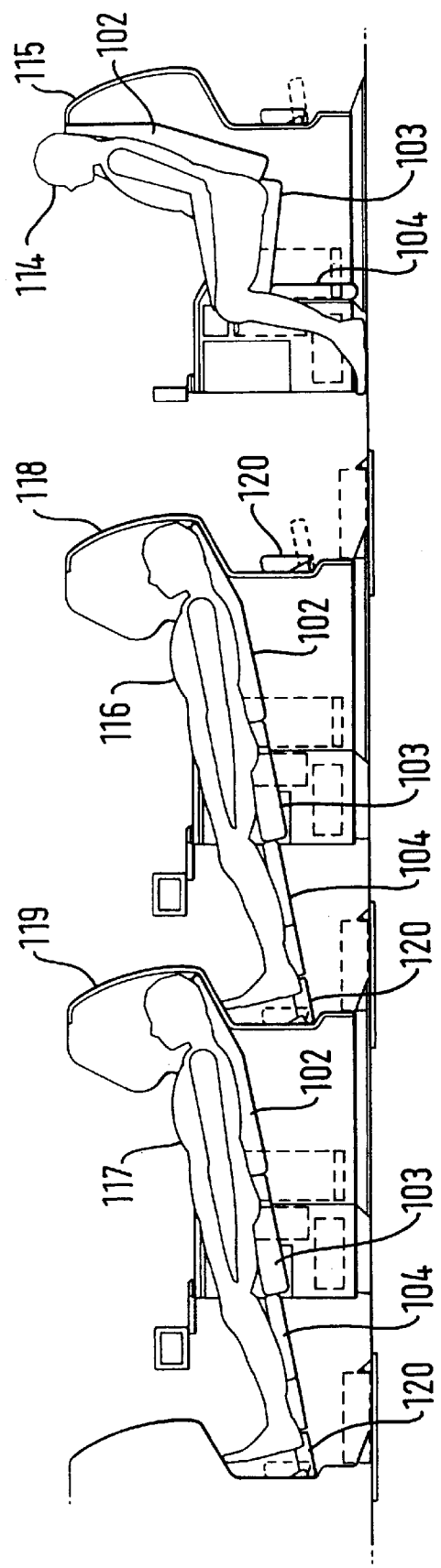
FIG. 25

SEATING UNIT

This is a divisional of U.S. application Ser. No. 09/097,149 filed Jun. 12, 1998, now U.S. Pat. No. 6,059,364 which is a continuation of U.S. application Ser. No. 08/529,818 filed Sep. 18, 1995, now abandoned.

The invention relates to a seating unit. More specifically the invention relates to a seating unit for an aircraft cabin.

In most aircraft the first class cabin is fitted with large, widely spaced apart seats in order to provide passengers with space and comfort during their journey. Presently, virtually every first class cabin is fitted with large double seats with a pitch (longitudinal distance between seats) of at least 1500 mm.

The present seat design suffers from several disadvantages. The seats are not designed to lie flat, and this makes sleeping uncomfortable. There is also a lack of privacy between the two seats. This can be very disconcerting for passengers, particularly when sleeping. Passengers have said that the sensation is akin to being in bed with a stranger. It would of course be possible to design these seats to lie flat. However, this creates another a problem relating to the manner in which the seats recline. Where a seat is reclined its back tilts into the accommodation space of the passenger behind. This is psychologically unpleasant for passengers who feel that their living space is being violated. It also makes it difficult for passengers behind a reclined seat to leave their own seats without disturbing other passengers. This is especially difficult for passengers occupying a window seat, who will disturb both passengers in the reclined seats in front and the passenger in the aisle seat next to him when he leaves his seat. One way of overcoming this problem would of course be to increase the pitch between seats up to say 2 meters. This is undesirable because, clearly, it reduces the seating capacity within the cabin for the sake of only one, relatively minor advantage.

Furthermore, the design of existing first class seating does not lend itself to providing individual storage space for each passenger. Passengers prefer to keep personal belongings within reach and presently this is only possible if bags, pillows, newspapers etc. are placed on the floor of the cabin. Consequently, the cabin can become very untidy during a flight, particularly if it is long overnight flight.

The present invention aims to overcome or at least reduce the above discussed problems.

According to one aspect of the invention there is provided a seating unit for an aircraft cabin, the unit comprising a fixed housing containing a primary seat with a reclinable back, wherein the back is arranged to recline in such a manner that it remains within the housing.

According to another aspect of the invention there is provided an accommodation unit comprising a reclinable principle seat and a secondary seat, the principle seat being movable to a reclined position at which, in co-operation with the secondary seat, a substantially flat sleeping surface is formed thereby.

According to a further aspect of the invention there is provided an aircraft including a cabin comprising a plurality of seating units or accommodation units as aforementioned.

Hitherto, the seats in an aircraft cabin have been arranged uniformly in a configuration in which rows of seats are positioned perpendicularly to the axis of the aircraft. Generally, each row of seats is spaced a fixed distance from the row in front so that each passenger has the same amount of space. The even spacing also enables the back of one seat to support a table and provide storage space; and in some cases even house a television screen and other ancillaries and utilities, for the occupant in the seat behind. The use of the rear of one seat to support utilities for the seat behind is an undesirable compromise which results in the actions of one passenger causing disruption to other passengers during a flight.

The invention provides a seating unit comprising a principal seat and a utilities unit for housing utilities for individual use by an occupant of the principal seat.

In the seating units to be described herein, each unit comprises a principal seat whose purpose is to provide support for a passenger sitting thereon. Utilities, i.e. ancillary features, such as a table, a television screen and storage are provided by a separate utilities unit or sideboard which together with the principal seat forms the seating unit. Thus, during a flight the use by a passenger of his utilities does not disrupt other passengers because such use is substantially contained within the domain of that passenger's seating unit.

The invention also provides an aircraft comprising a cabin containing a plurality of seats, at least some of the seats being arranged in an echelon.

It will be apparent from consideration of the description of our earlier application and of the description that follows hereinafter that an echelon configuration enables each passenger to be provided with a greater degree of privacy. Such an arrangement enables screens to be placed between adjacent seating units to define the extent of each passenger's domain. An echelon configuration can also enable more seats to be provided within the same cabin space without any perceived loss of individual passenger space.

In the following there will be described a reclining seat in which a leg support panel is cantilevered out from the front of the seat as the seat is reclined by a scissor-type cantilever arrangement. Such a scissor-type arrangement is used extensively in aircraft seats.

According to another aspect of the invention there is provided a seat comprising a back portion, a seating portion and a trolley associated with the seating portion, the trolley being drivable to move the seating portion between a retracted position and an extended position, the seating portion and the back portion cooperating such that as the seating portion is moved between the retracted and extended positions the back portion is caused to move between substantially upright and reclined positions.

The above and further features of the invention are set forth with particularity in the appended claims and together with advantages thereof will become clearer from consideration of the following detailed description of an exemplary embodiment of the invention given with reference to the accompanying drawings.

In the drawings:

FIG. 3 is a plan view of an aircraft cabin containing plural accommodation units in an outboard-facing configuration;

FIG. 4 is a plan view of an aircraft cabin containing plural accommodation units in an inboard-facing configuration;

FIG. 25 shows side views and plan views of accommodation units in sitting and sleeping positions.

Figure 1:
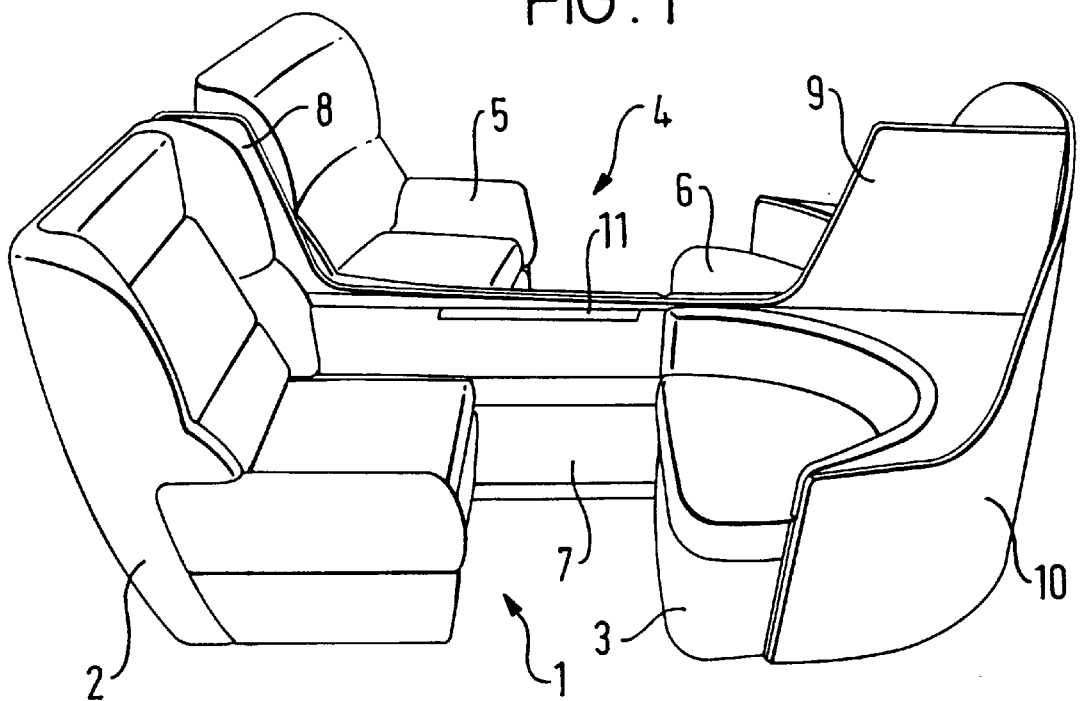
FIG. 1 is a first perspective view of a first accommodation unit embodying the invention.

Referring now to FIG. 1 of the accompanying drawings there is shown an accommodation unit, or seating unit 1 comprising a primary, reclinable seat 2 and a secondary, fixed seat 3. Both seats 2, 3 of the seating unit 1 are provided for use by a single first class passenger. It is, of course, entirely up to the passenger how he uses the seats 2, 3 but it is envisaged that he will make use of the primary seat 2 himself during the journey and use the secondary seat 3 for other passengers who he invites to join him during the journey.

A second unit 4 comprising its own primary seat 5 and secondary seat 6 may be placed next to the first unit 1. In such a situation, the first unit 1 and the second unit 4 are separated from each other by a dividing wall 7 which provides privacy between the two units 1, 4. To this end, the dividing wall 7 comprises a retracting screen 8 between the primary seats 2, 5 of the two units and a screen 9 between the secondary seats 3, 6. A further screen wall 10 extends behind the two secondary seats 3, 6 to provide further privacy.

The two units 1, 4 shown in FIG. 1 are designed to be placed in the centre of the cabin and offered to a couple who are travelling together. For this reason, the two screens 8, 9 are modestly dimensioned and do not prevent passengers sitting in the two units 1, 4 from conversing with each other. Conveniently, a retractable screen (not shown) may be provided in either or both the screens 8, 9 for extension above the dividing wall to separate the two units 1, 4 entirely from each other when the passengers are not travelling together.

Figure 2:
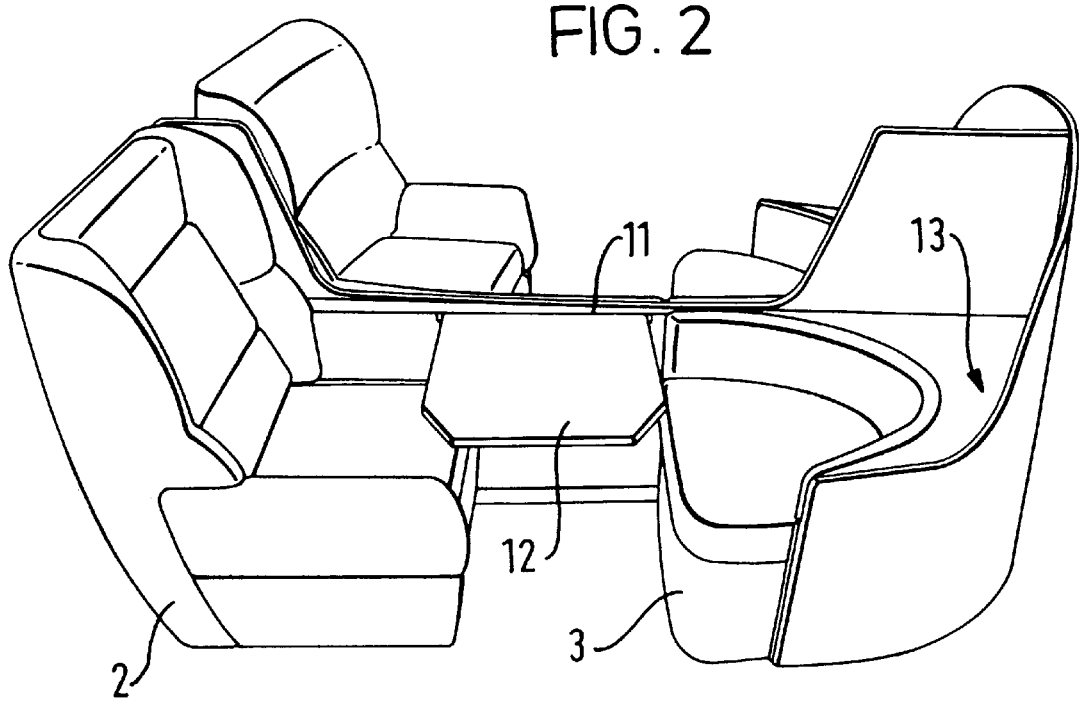
FIG. 2 is a second perspective view of the first accommodation unit.

The space between the primary seat 2 and the secondary seat 3 of each unit is large, and indeed is sufficient for a table usefully to be placed between the two seats 2, 3. The dividing wall 7 includes a table storing portion 11. As shown in FIG. 2, a table 12 housed in the storing portion 11 may be placed between the primary seat 2 and the secondary seat 3 during a flight should the passenger so wish.

A flat area or counter top 13 between the secondary seat 2 and the screen 10 can be used by the passenger to store his briefcase, newspapers or other personal effects should he so wish. Conveniently, a television screen (not shown) may be provided hinged below the surface 13, or indeed within the dividing wall 7.

A greater degree of privacy may be achieved by staggering or overlapping the seating units. One way in which the seating units may be staggered is shown in FIG. 3 of the accompanying drawings. In this arrangement plural seating units 15 are provided around the edge of a cabin 16. Each of the units 15 comprises a primary seat 17 and a secondary seat 18. When a passenger sits in the primary seat 17 of any of the units 15 he faces towards the outside of the aircraft. For the sake of convenience this overlapping configuration will be referred to herein as an outboard-facing arrangement. It should be noted that two pairs of units 1, 4 and 1', 4' are provided along the centre line 19 of the cabin. These units 1, 4 and 1', 4' are similar to the units shown in FIGS. 1 and 2, but it will be noted that there is a greater spacing between the units 1' and 4' than there is between the units 1 and 4. The amount of spacing between the units may be selected depending on the space available within the cabin and in anticipation of passengers preferences.

Another way in which seating units may be staggered is shown in FIG. 4 of the accompanying drawings. Again, plural seating units 21 are provided around the edge of the cabin 16, each seating unit 21 comprising a primary seat 22 and a secondary seat 23. When a passenger sits in the primary seat 22 of any of the seating units 21 he will face towards the inside of the aircraft cabin. For the sake of convenience this overlapping configuration will be referred to herein as an inboard-facing arrangement. Like the arrangement shown at FIG. 3, pairs of units 1, 4 and 1', 4' are also provided along the centre line 19 of the cabin.

These staggered arrangements both make efficient use of cabin space to the extent that the same number of passengers can be accommodated in the cabin 16 as is possible to accommodate using the previously known double-seating arrangement with the larger 2 meter spacing. The choice of whether to use an inboard-facing arrangement or an outboard-facing arrangement is arbitrary because there are no significant cost advantages to either arrangement over the other arrangement. Preliminary research has shown that the outboard-facing arrangement is likely to be preferred by passengers because it provides a greater sensation of privacy than does the inboard-facing arrangement. With the outboard-facing arrangement passengers must turn around bodily to see other passengers in the cabin, whereas with the inboard-facing arrangement passengers are already facing inwardly towards other passengers.

Figure 5:
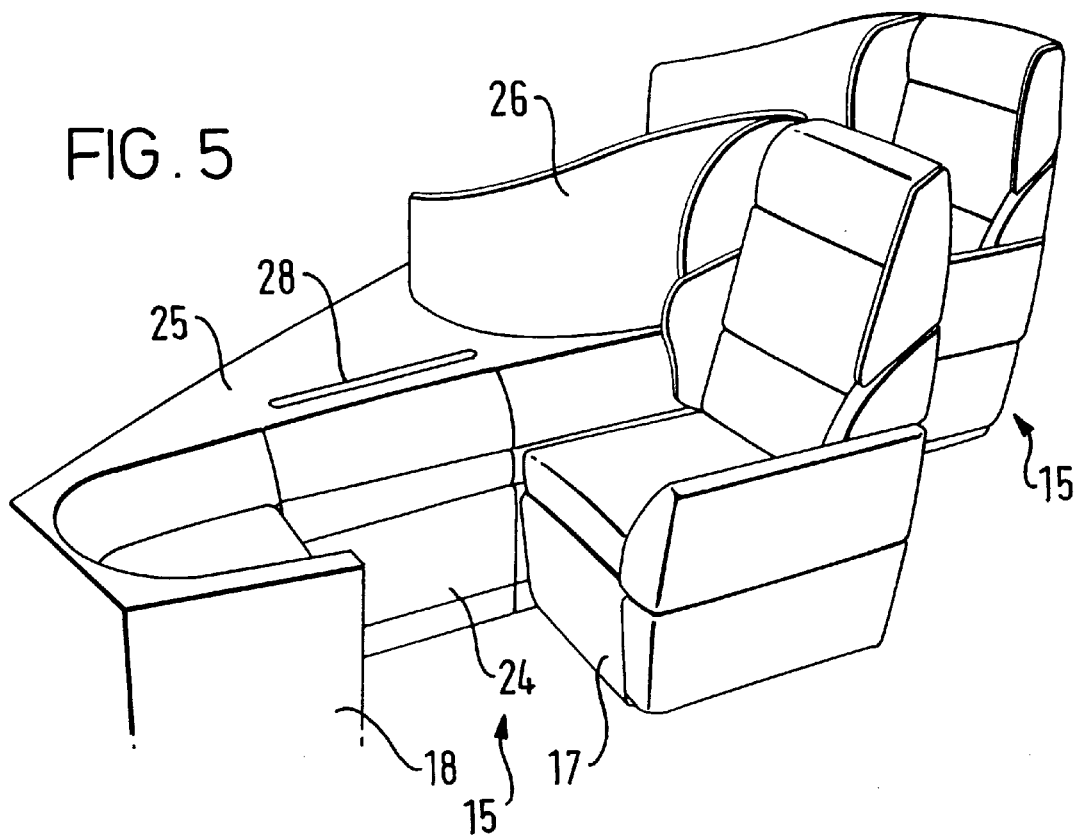
FIG. 5 is a perspective view of a second accommodation unit embodying the invention for use in the outboard-facing configuration of FIG. 3.
Figure 6:
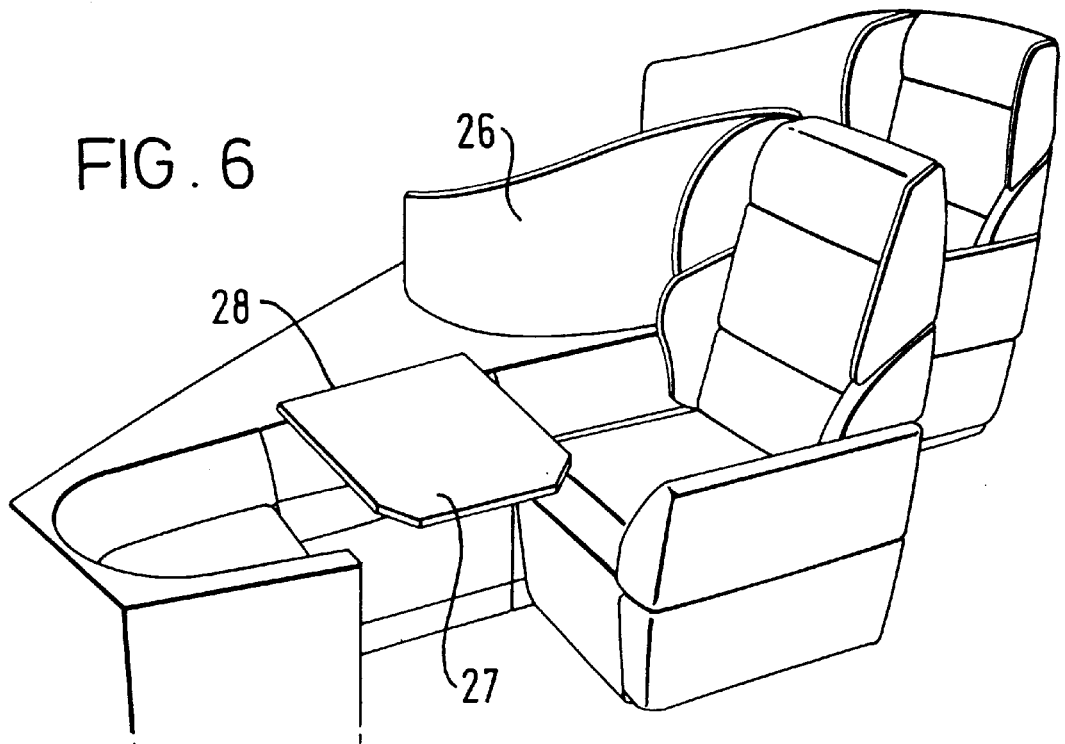
FIG. 6 is the second perspective view of the second accommodation unit.

The design of the seating units differs slightly depending on whether the seating unit is for a central position or is for an edge position in an inboard-facing arrangement or as an edge position in an outboard-facing arrangement. FIGS. 5 and 6 each show perspective views of two of the seating units designed for use in the outboard-facing arrangement of FIG. 3. It should be noted that whilst the general design of each seating unit 15 is substantially the same of that of the above described seating unit 1, insofar as the primary seats 17 and the secondary seat 18 are positioned faced apart and facing each other, many details of the design are different.

Extending between one side of the primary 17 and secondary 18 seats is a wall 24. A counter top 25 extends from the wall 24 to the inner wall of the cabin (not shown)

and provides a surface for the passenger to place his personal belongings should he so wish. Further storage space may of course also be provided within the wall 24 if so required. A screen 26 extends from behind the primary seat 17 across the counter top 25. The screen 26 defines a boundary between consecutive seating units 15, providing privacy from other passengers. As shown in FIG. 6, a table 27 may be provided within the counter top 25 behind an access slot 28.

Figure 7:
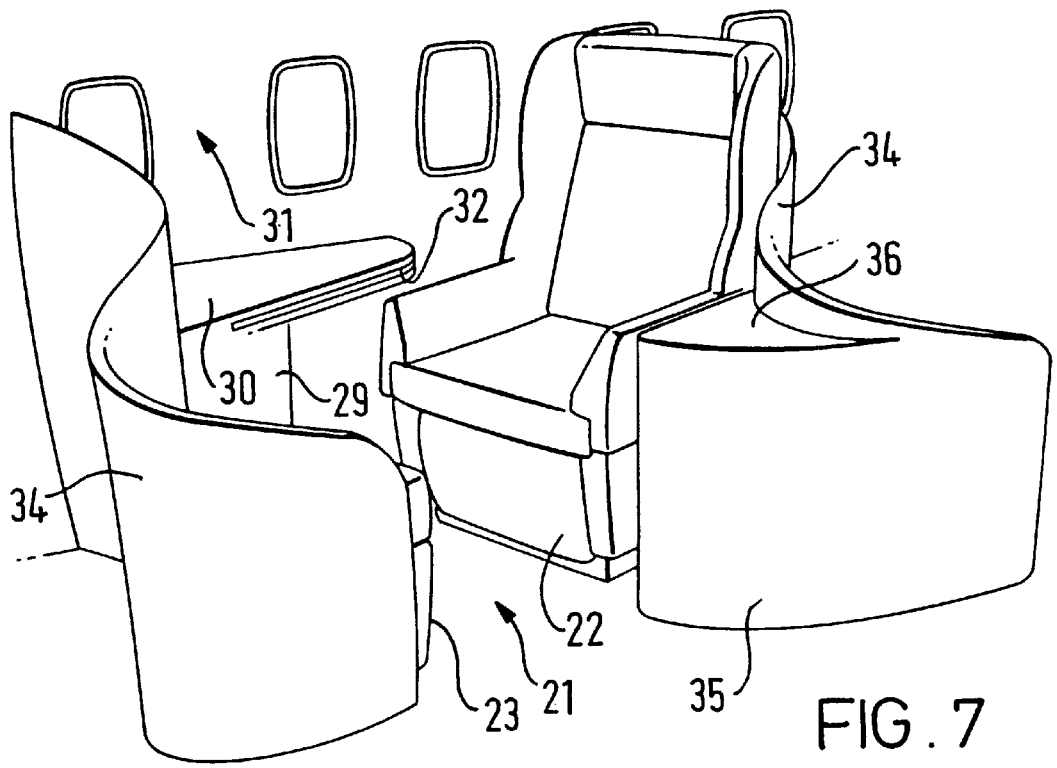
FIG. 7 is a first perspective view of a third accommodation unit embodying the invention for use in the inboard-facing configuration of FIG. 4.
Figure 8:
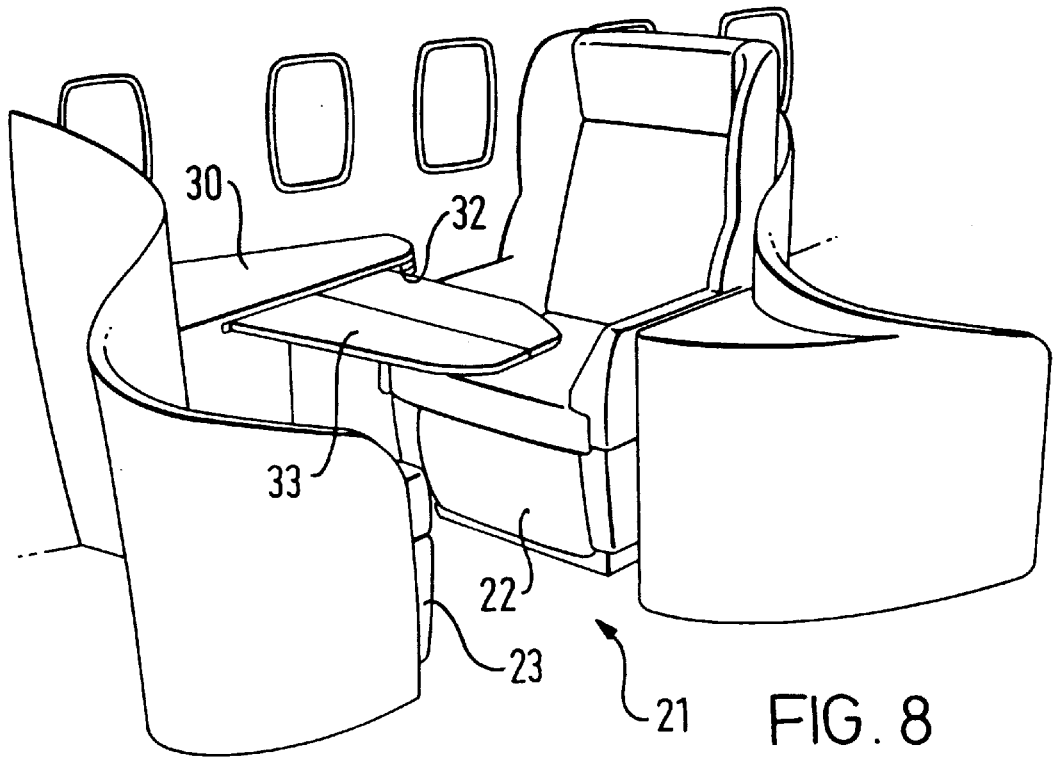
FIG. 8 is a second perspective view of the accommodation unit.

FIGS. 7 and 8 each show a perspective view of a seating unit 21 suitable for the use in the inboard-facing configuration of FIG. 4. The basic design of the seating unit 21 is substantially the same as the above described seating units 1 and 15, insofar as the unit 21 comprises spaced apart primary 22 and secondary 23 seats facing each other, but again several details of the design differ from that of the above described units 1 and 15.

A wall 29 extends along one side of the primary seat 22 and secondary seat 23 and a counter top 30 extends from the top of the wall to the cabin wall 31. A slot 32 provided in the counter top 30 contains a table 33 which may be slidingly or pivotally mounted such that it can be pulled out by a passenger and positioned between the primary 22 and secondary 23 seats as shown in FIG. 8. Consecutive seating units 21 are separated from each other by a privacy screen 34. A further structure comprising a wall 35 and surface 36 is provided between the screen 34 and the primary seat 22 for use by the passenger. Cupboards or other storage space (not shown) may be provided in the wall 29 and/or the wall 35.

As shown, the wall 29 does not extend alongside the primary seat 22. Instead a portion is omitted to enable the passenger to use the space under the counter top 30 for storing personal baggage. The primary seat 22 (and indeed the primary seats 2 or 17) may be secured pivotally within the seating unit 21 to enable the seat to be pivoted to a forward facing position (if necessary to satisfy regulations regarding take-off and landing). In this case, the omission of a portion of the wall 29 would enable the seat 22 to be pivoted to a position at which the passengers legs are placed under the counter top 30.

Figure 9:
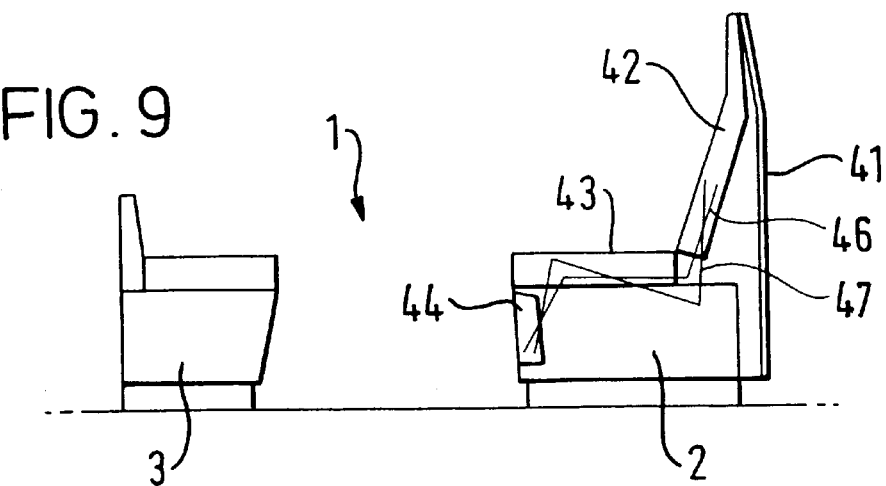
FIG. 9 is a first schematic sectional view of a seat.
Figure 10:
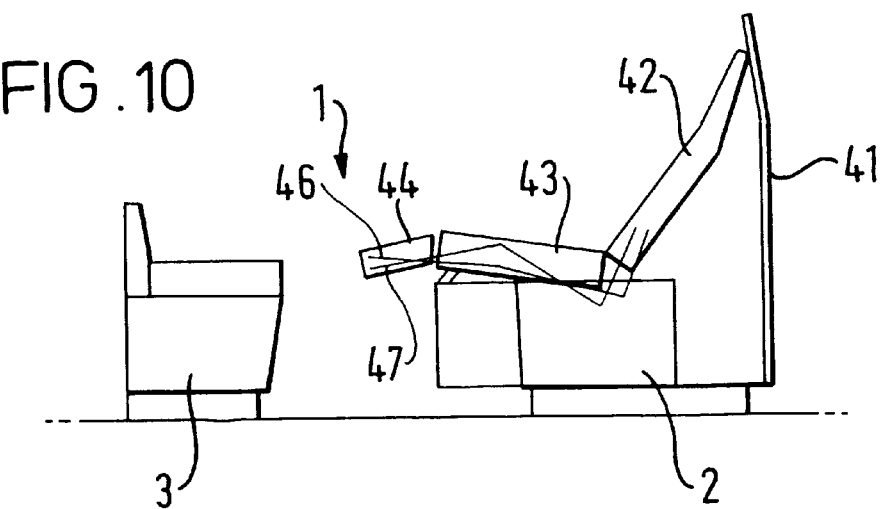
FIG. 10 is a second schematic sectional view of a seat.
Figure 11:
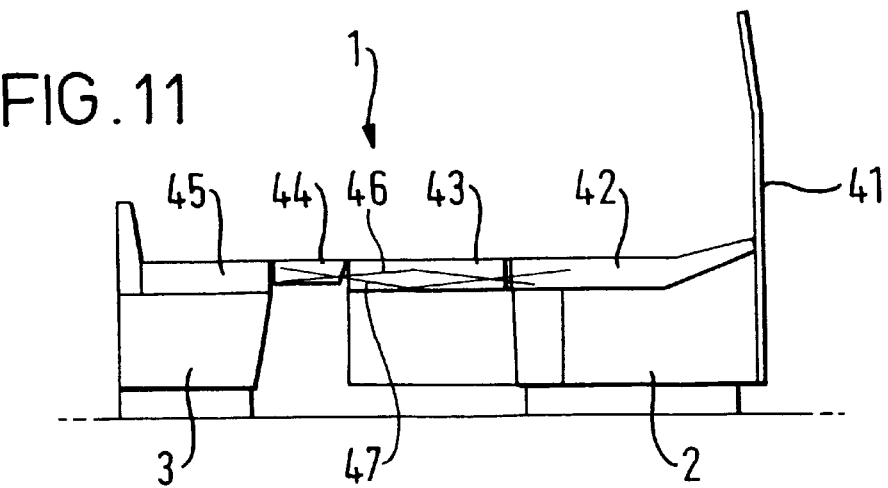
FIG. 11 is a third schematic sectional view of a seat.

The primary seats 2, 17 and 22 are reclinable. FIGS. 9, 10 and 11 of the accompanying drawings show in schematic form how one of the primary seats, say primary seat 2, can be continuously reclined between an upright position (FIG. 9) and a substantially horizontal position (FIG. 11). The primary seat 2 comprises a fixed housing 41 which houses a seat back portion 42, a seating portion 43, and a leg rest 44. During a flight the seat 2 can be reclined to a position (shown in FIG. 10) in which the passenger (not shown) is laid back in the seat with his back supported by the back portion 42 and his legs supported by the leg support 44.

Should the passenger wish to sleep, the seat portion 43 and leg rest 44 can be moved out of the housing 41 until the leg rest 44 meets the seating portion 45 of the secondary seat 3. In this position, the back portion 42 lies substantially flat in the housing 41. Thus, the back portion 42, the seating portion 43 and the leg rest 44 of the primary seat, together with the seating portion 45 of the secondary seat form a substantially flat surface upon which the passenger may sleep. The reclining mechanism of the primary seat is represented schematically by crossed lines 46, 47 in the drawings because the design of such a mechanism is per se well known it requires no further explanation herein. The reclining mechanism may be operated manually or automatically by way of electric motors, etc. (not shown).

It should be noted that the primary seat is arranged so that the back portion 42 always remains within the housing 41 and thus does not impinge on the accommodation space of the other passengers behind.

Figure 12:
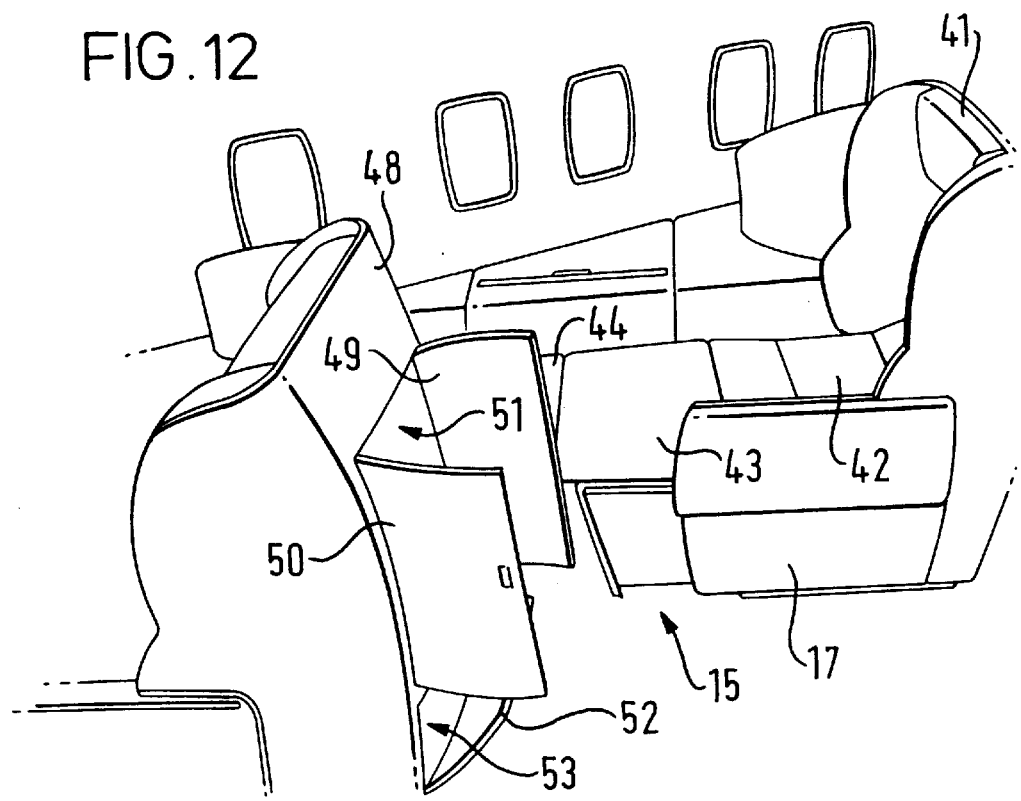
FIG. 12 is a third perspective view of the second accommodation unit.

FIG. 12 is a perspective view of the outboard-facing seating unit 15 with the primary seat fully reclined so that its back portion 42, seat portion 43 and leg rest 44 form a horizontal sleeping surface. The drawing also shows the housing 48 of another seating unit. In the back of the housing doors 49 and 50 provide access to a cupboard or wardrobe space 51 and a lower door 52 provides access to further storage space 53.

Figure 13:
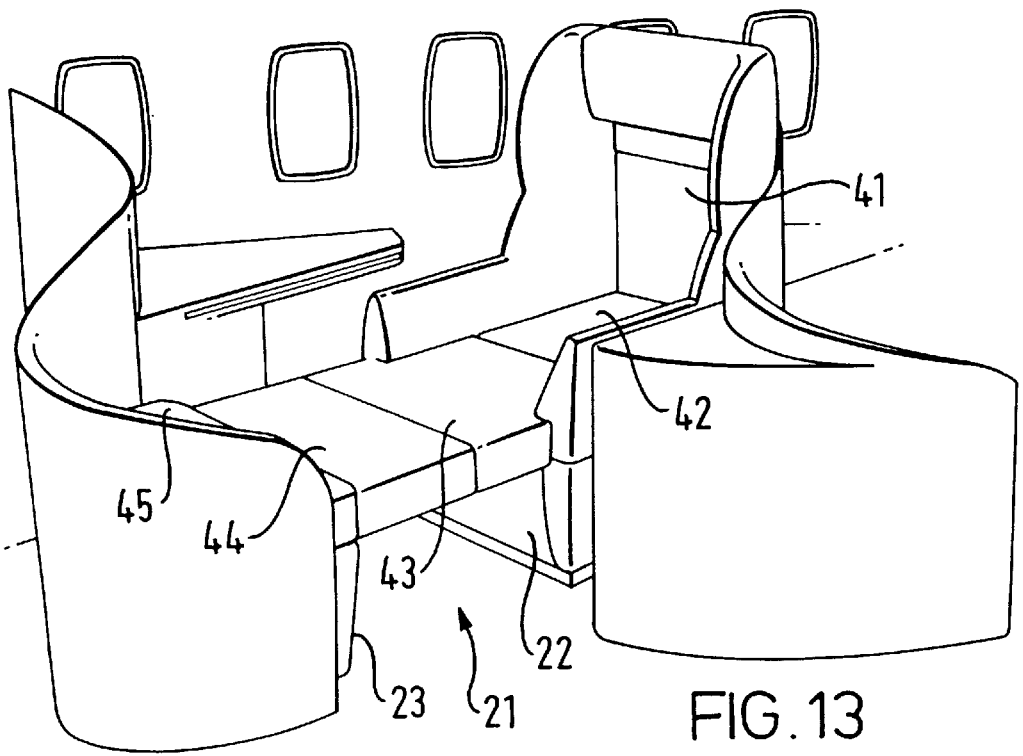
FIG. 13 is a third perspective view of the third accommodation unit.

FIG. 13 similarly shows an inboard-facing unit 21 in which the back portion 42, seating portion 43 and leg rest 44 of the primary seat 22 have been fully reclined to form, together with the seating portion 45 of the secondary seats 23, a substantially flat, horizontal sleeping surface.

Turning now to FIGS. 14 to 17 of the accompanying drawings there are shown a primary seat 2 within a fixed structure or housing 41 which houses a back portion 42, a seating portion 43, and a leg rest 44.

Figure 14:
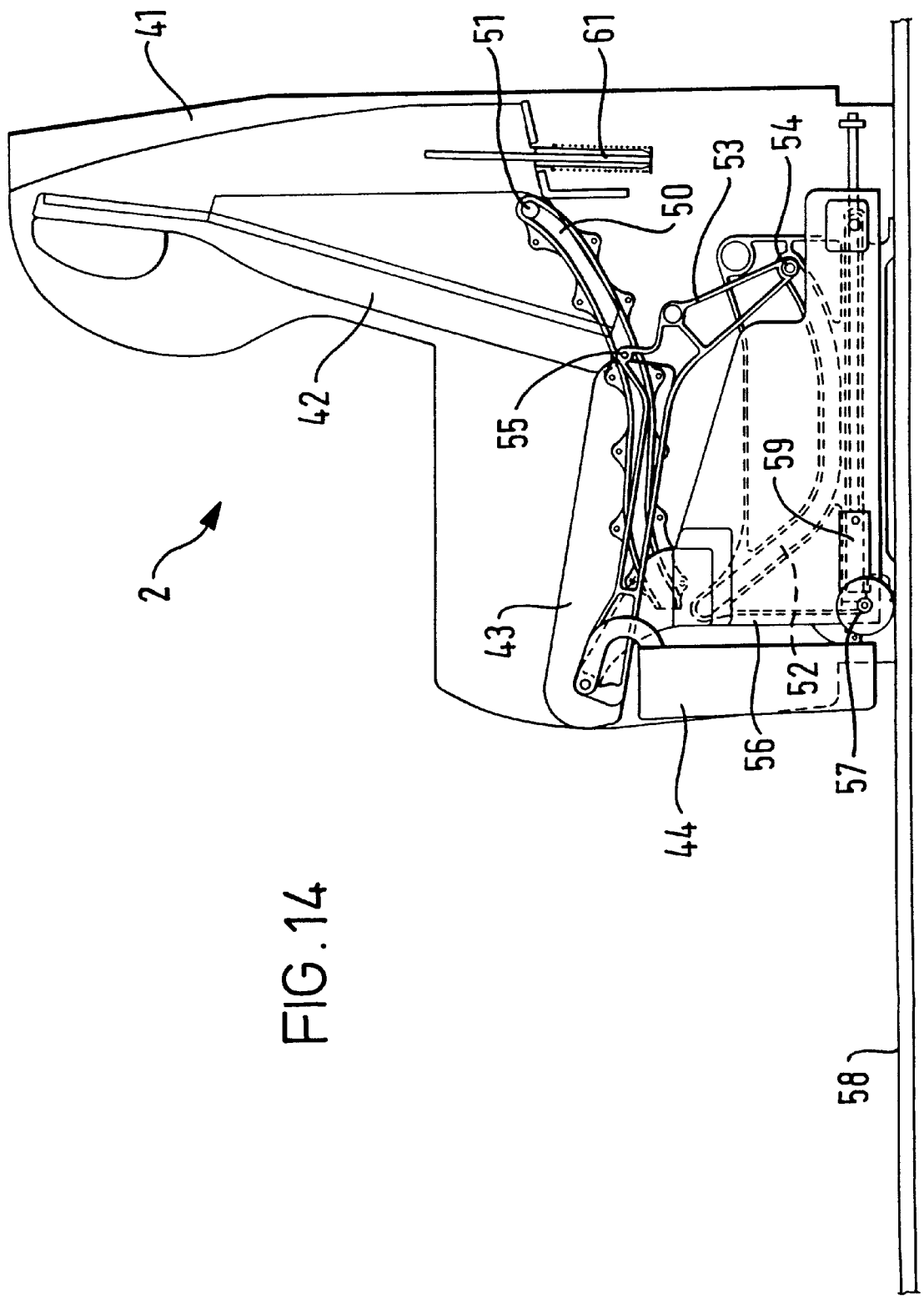
FIG. 14 is a first schematic sectional view of a seat.

FIG. 14 shows the seat 2 in a retracted position in which the back portion is substantially fully upright. The seat includes a reclining mechanism comprising a back runner 50 to which the back portion 42 is connected at a support point 51. The reclining mechanism further comprises a seating runner 52 to which the seating portion 43 is connected via a guide member 53 at a support point 54. The seating portion 43 is connected at a pivot point 55 to one end of the back portion 42 and is supported by a trolley member 56 having wheels 57 that roll over the floor 58 of the cabin. Tracks (not shown) may be provided on the floor 58 to prevent excessive wear of the floor and facilitate smooth movement of the seat. It will be appreciated that runners and tracks are provided on both sides of the seat for balanced support of the various parts of the seat.

Figure 15:
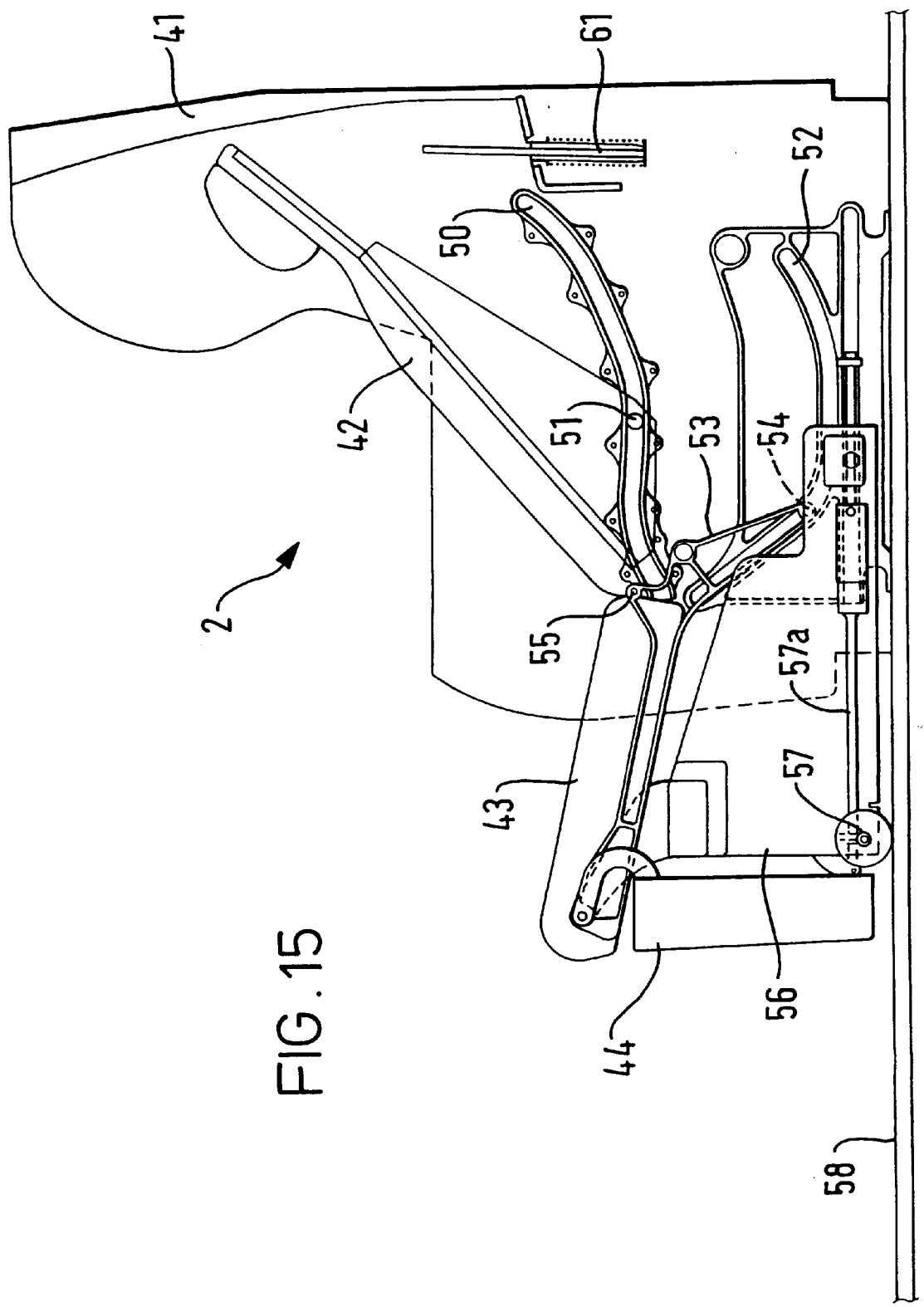
FIG. 15 is a second schematic sectional view of the seat of FIG. 14.

The seat is driven by electric motors (not shown) controlled by way of a control panel (not shown). When a passenger selects "recline" on the control panel a motor causes the seating portion 43 to be driven forward, by way of rotation of a screw shaft 59, out of the housing 41 to an extended position in which the back portion is in a reclined position such as shown in FIG. 15. The driving forward of the seating portion 43 causes the back portion 42 to be guided along a path defined by the back runner 50. The form of the runners 50 and 52 is selected in relation to the height of the trolley member 56 to guide the orientation of the seating portion 43 so that it remains comfortably inclined to the horizontal while the steepness of the back portion 42 is reduced.

Figure 16:
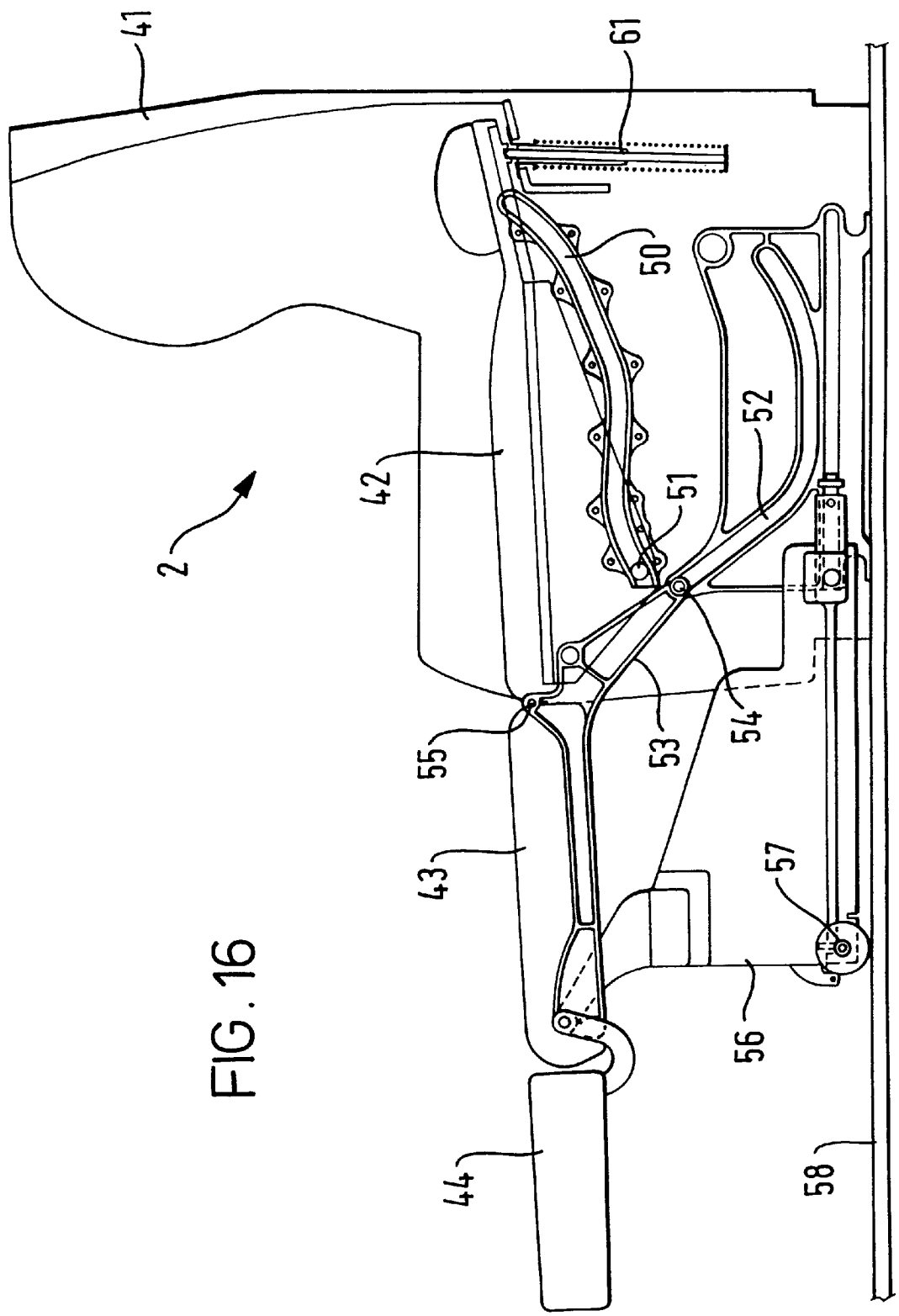
FIG. 16 is a third schematic sectional view of the seat of FIG. 14.

As the seating portion continues to be driven beyond the reclined position shown in FIG. 15 toward the extended position shown in FIG. 16 a second motor (not shown) is actuated independently of the driving of the trolley to drive a screw arrangement 60 and thereby cause the leg rest portion 44 to move out of the substantially upright or vertical position shown in FIGS. 14 and 15 toward the substantially horizontal or reclined position shown in FIG. 16. A damper 61 may be provided at the rear of the housing 41 to provide support for the free end of the back portion 42 as the seat moves toward and comes to rest in the flat surface position of FIG. 16.

Figure 17:
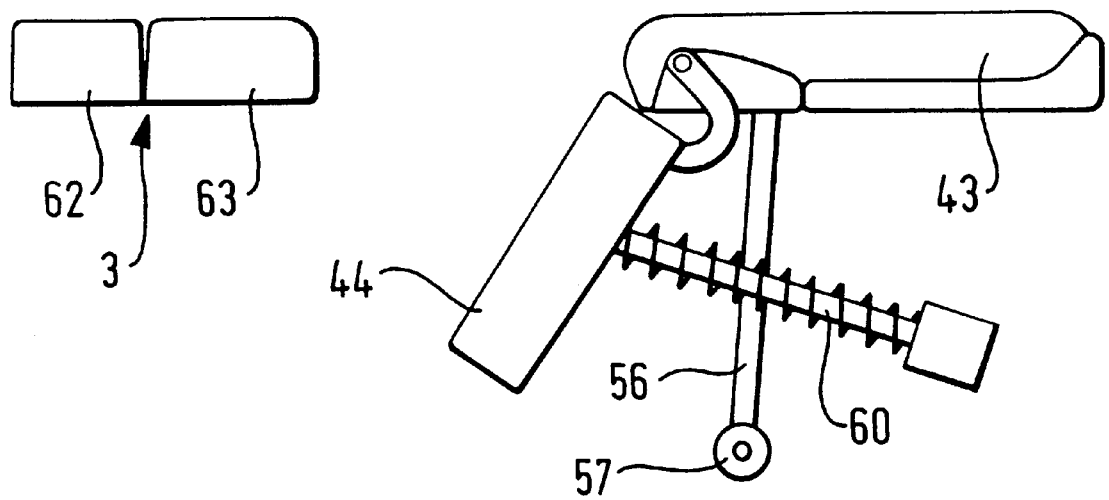
FIG. 17 is a fourth schematic sectional view of the seat of FIG. 14.

In order to avoid the possibility of a passenger's feet becoming trapped between the leg rest 44 and the secondary seat 3 during the transition of the leg rest 44 from the vertical to the horizontal, the secondary seat 3 may comprise a fixed rear seat portion 62, and a front seat portion 63 pivotally connected to the rear portion 62 as shown in FIG. 17 of the accompanying drawings. In the event that a passenger places his feet, or indeed any other object, between the leg rest 44 and the secondary seat 3, the front portion 63 will pivot up out of the way of the object. If a passenger does not wish to make use of the secondary seat 3, the front portion 63 may be pivoted to a position over the rear portion 62 to provide more usable floor space for the passenger within his seating unit.

In steady flight the main axis of an aircraft is inclined to the horizontal. Typically an aircraft flies at a pitch of 3°, i.e. with its nose pointing slightly upward. If the seating unit were designed to recline to form a substantially flat sleeping surface at a position which is horizontal to the plane of the aircraft, then a passenger would be caused to lie in a position where his head is lower than his feet when the aircraft is flying at its normal 3° pitch. Such a position is undesirable not least because passengers find it uncomfortable. In order to avoid the passenger problems with such a position, the reclining mechanism is designed to define a flat sleeping surface which is inclined slightly by, say 3°, so that relative to the plane of the aircraft the passenger lies in a position where his head is higher than his feet. As a result in normal steady flight the passengers head will lie in the same horizontal plan as his feet. Conveniently, placing the sleeping surface at a slight incline enables the arm rests etc. in the housing more easily to be designed to provide extra clearance for the passenger's shoulders while he is lying down.

Figure 18:
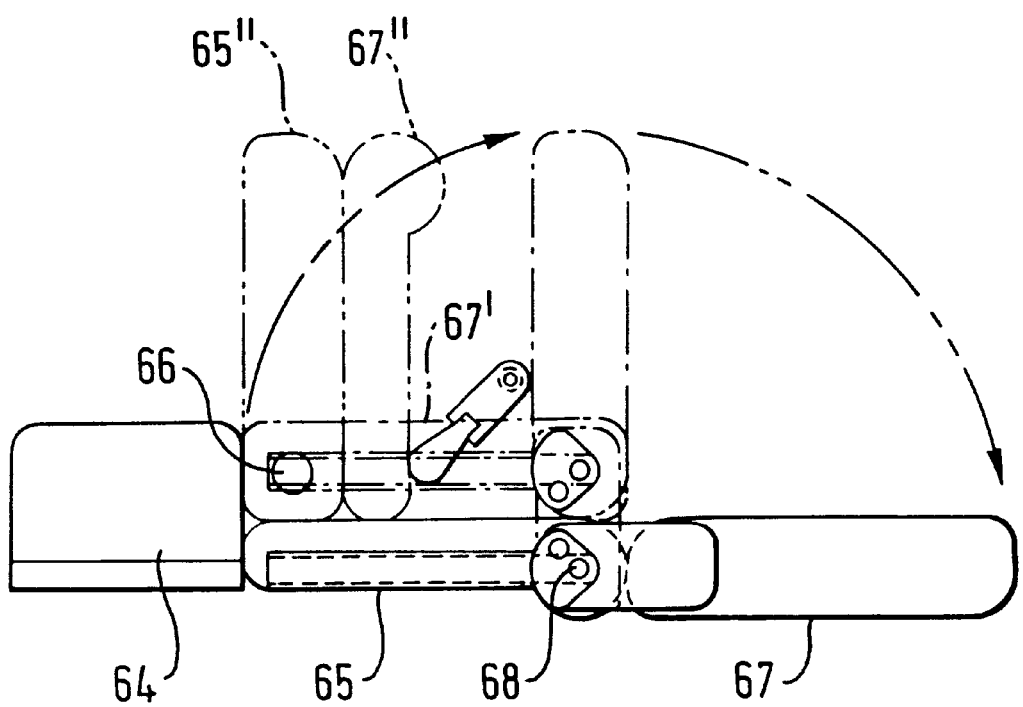
FIG. 18 is a schematic sectional view of an alternative secondary seat arrangement.

FIG. 18 shows an alternative secondary seat arrangement, a so-called bi-fold arrangement the secondary seat comprises a fixed seat portion 64, a rear seat portion 65 pivotally connected at a join 66 to the fixed seat portion 64 and a front seat portion 67 pivotally fixed to the rear seat portion 65 at a join 68. The secondary seat can be moved between a fully extended position in which the front and rear seat portions are in the positions represented by the references 65 and 67, a partially extended position in which the front portion is pivoted about the join 68 to rest on top of the rear portion as represented by the references 65 and 67', and a stowing position in which the rear portion is pivoted about join 66 to place the front and rear portions in the positions represented by the references 65" and 67".

Figure 19:
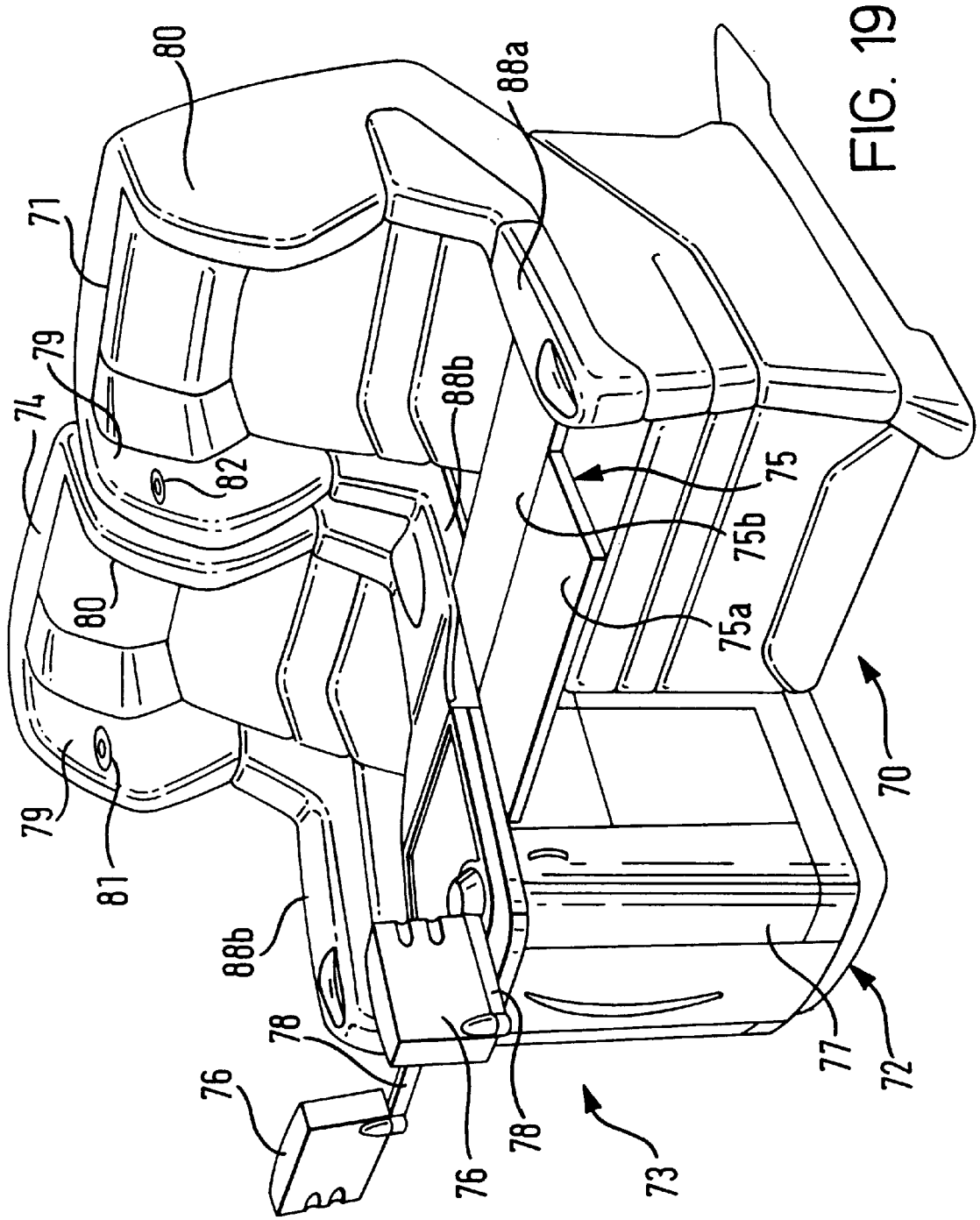
FIG. 19 is a first perspective view of a fourth accommodation unit embodying the invention.

FIG. 19 shows a seating unit 70 comprising a reclinable seat 71 and a sideboard or utilities unit 72. A second seating unit 73, placed next to the seating unit 70 and comprising a reclinable seat 74, has its own utilities in the utilities unit 72. Although not shown in the drawings, the two units 70, 73 may be separated from each other by a dividing wall to provide privacy between the two units. The two units 70, 73 shown in FIG. 19 are designed to be placed in the centre of the cabin and offered to two passengers travelling together. The utilities unit 72 contains for each seating unit 70, 73 a table 75, a TV-type monitor 76 and a cupboard 77, and usefully defines flat surfaces for smaller objects such as tea cups and the like. The cupboard 77 may be used by a passenger to store personal items such as a wash bag, headphones etc. and space may be provided for storing magazines, newspapers and the like. Conveniently, a life vest can be stored in the utilities unit 72.

As shown in FIG. 19 the table 75 comprises two parts 75a and 75b hinged together, the outermost part being pivotally mounted in the utilities unit in a "lift and drop" arrangement. That is to say, the two parts 75a, 75b of the table may be folded together and then rotated up to drop vertically into a storage space below a cover (now shown) in the utilities unit 72. When the table is again needed it can be lifted out of the storage area, rotated into the horizontal position, and the two parts unfolded ready for use. Any of the other well known table storage arrangements use in aircraft may, of course, be used instead of the "lift and drop" arrangement if so desired.

The TV-type monitor 76 is shown mounted to a pivotal arm 78 on the utilities unit 72. The monitor 76 provides in-flight entertainment for the passenger and need not be mounted as shown. Alternative is arrangements where the monitor 76 retracts into the utilities unit 72 or where the monitor 76 is removably secured to the unit 72 for example may instead be employed.

The use of a sideboard or utilities unit 72 enables a large number of ancillary features to be deployed off-seat. Removing the table and monitor entirely from the seat reduces the stress in the seat by removing the load of those utilities. The seat and utilities unit thus cooperate to provide a seating unit that offers a comfortable and useful travelling environment for passengers.

The seating unit 70 comprises a pair of shields 79, 80 at approximately head height for a passenger sitting upright in the seat. The shields 79, 80 increase the perception of privacy for the seat's occupant. Lights 81, 82 may be provided in the shields for use by the passenger if desired.

Figure 20:
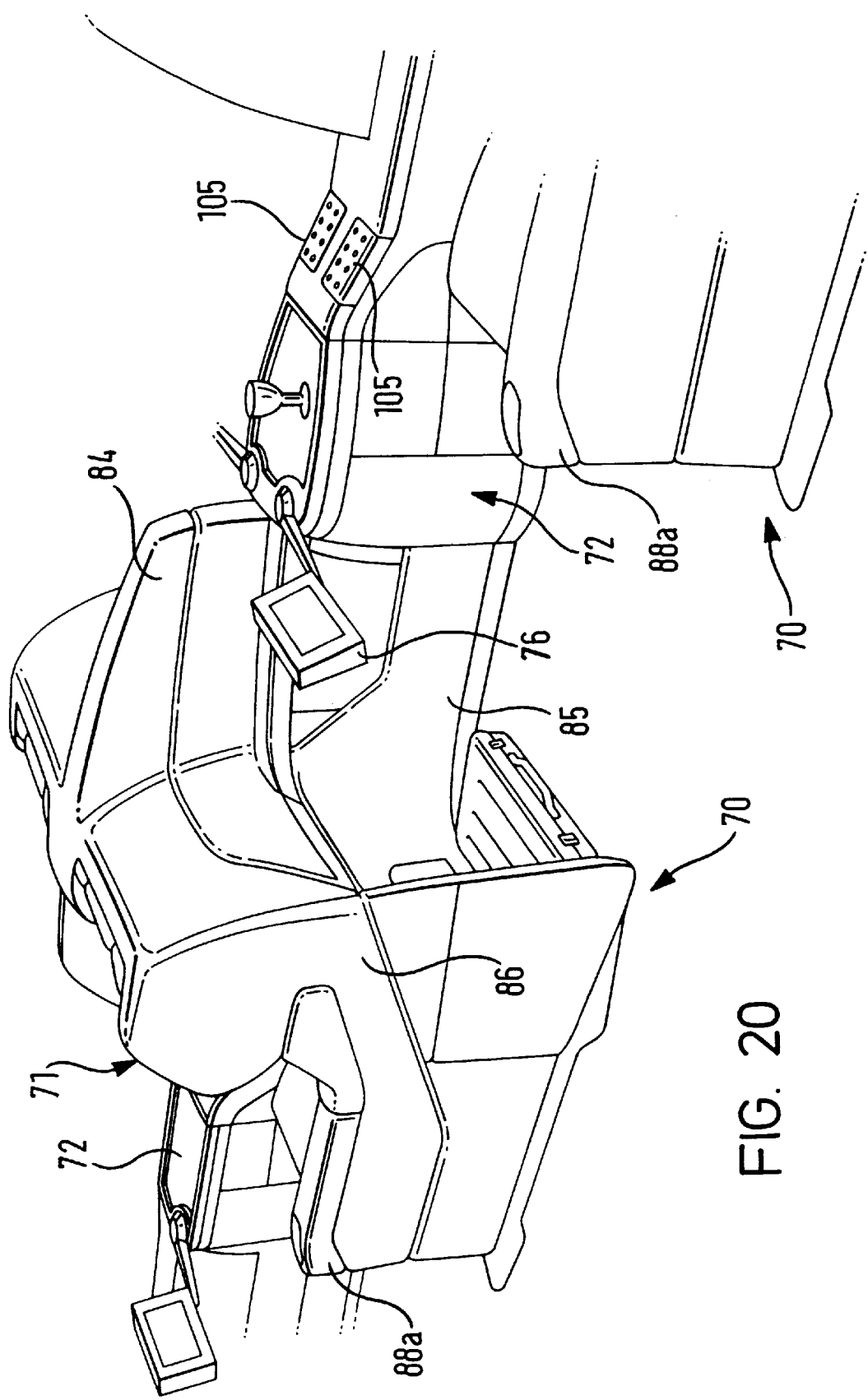
FIG. 20 is a second perspective view of the fourth accommodation unit.
Figure 21:
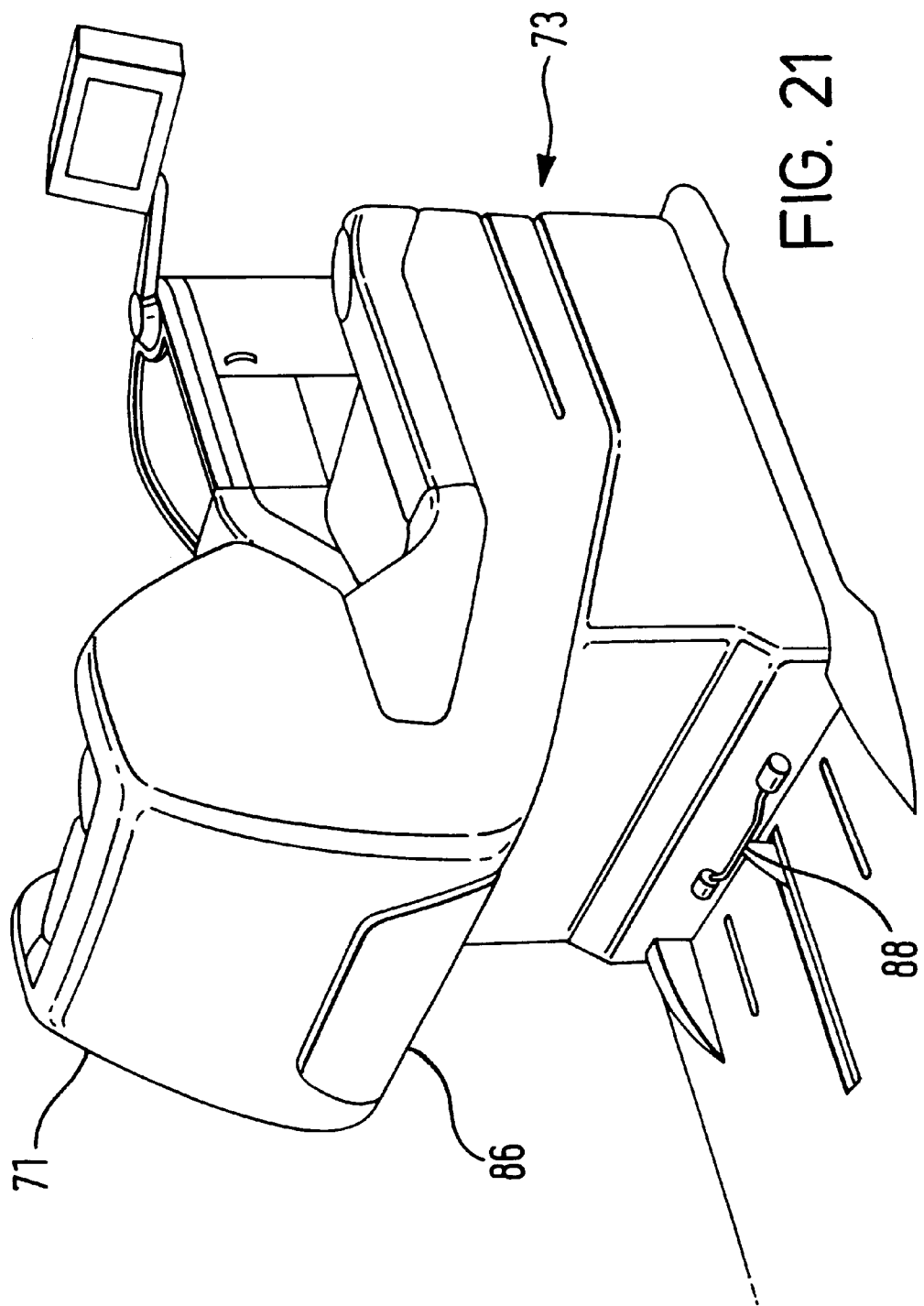
FIG. 21 is a first perspective view of a fifth accommodation unit embodying the invention.

FIG. 20 of the accompanying drawings illustrates how several pairs of seating units may be arranged along the centre of a cabin. Each passenger's area is defined by the seat 71 itself, the utilities unit 72, the back of seating unit 83 in the front, and screens 84, 85 extending from behind the seating units 83 in front of the utilities unit 72. For reasons that will become clear from the description that follows hereinafter the upper part of each seat defines an overhang 86 to the rear of the seating unit. Space below the overhang 86 may be left open as shown in FIG. 20 or may be partly enclosed to provide in both cases a briefcase (or similar) storage area for the passenger in the seat behind. A spring loaded clamp 88 may be provided to secure briefcases and the like placed in the storage area. Other storage space for such items as a life vest may be provided in the arms 88a, 88b of the seat.

Figure 22:
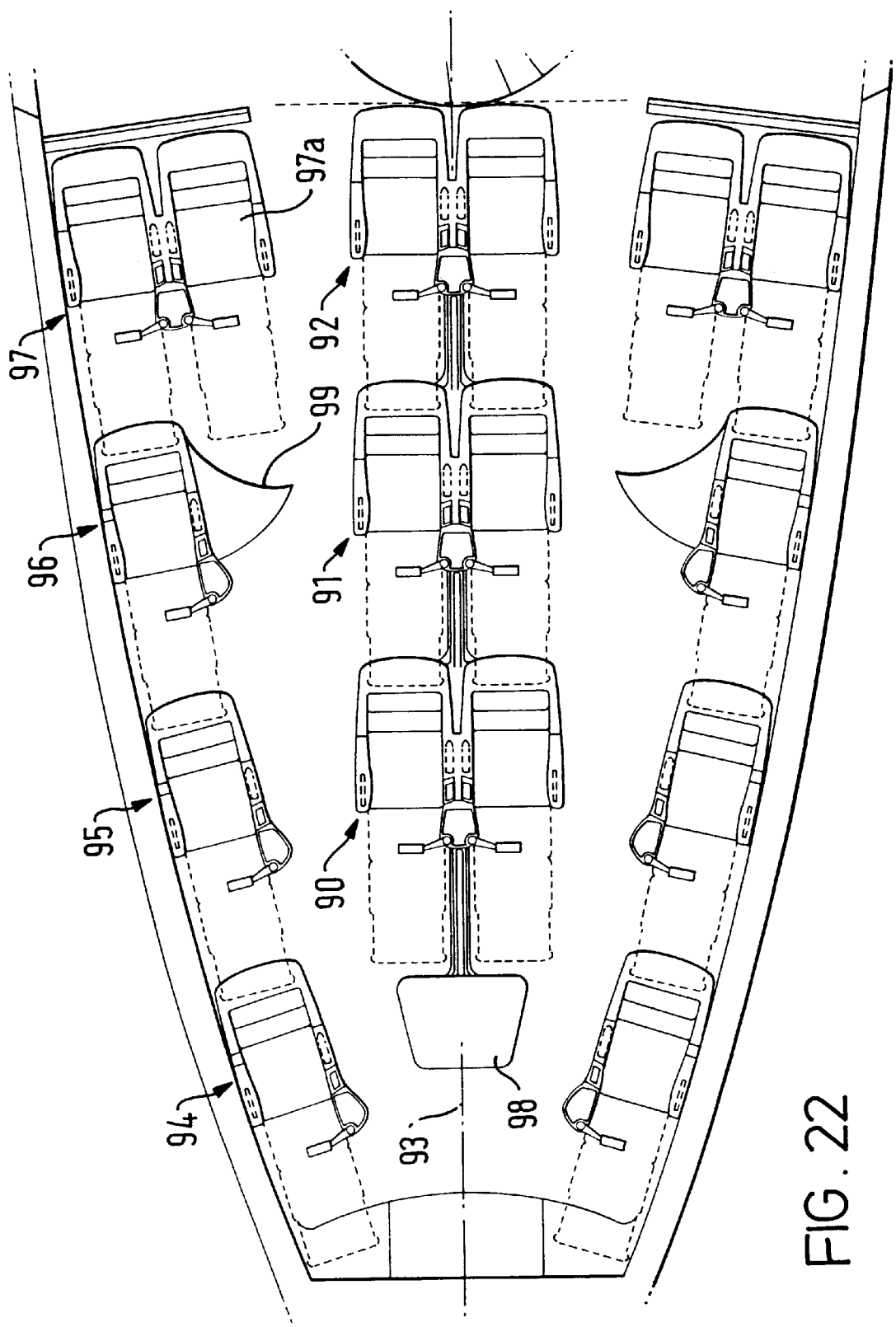
FIG. 22 is a plan view of an aircraft cabin containing plural accommodation units.
Figure 23:
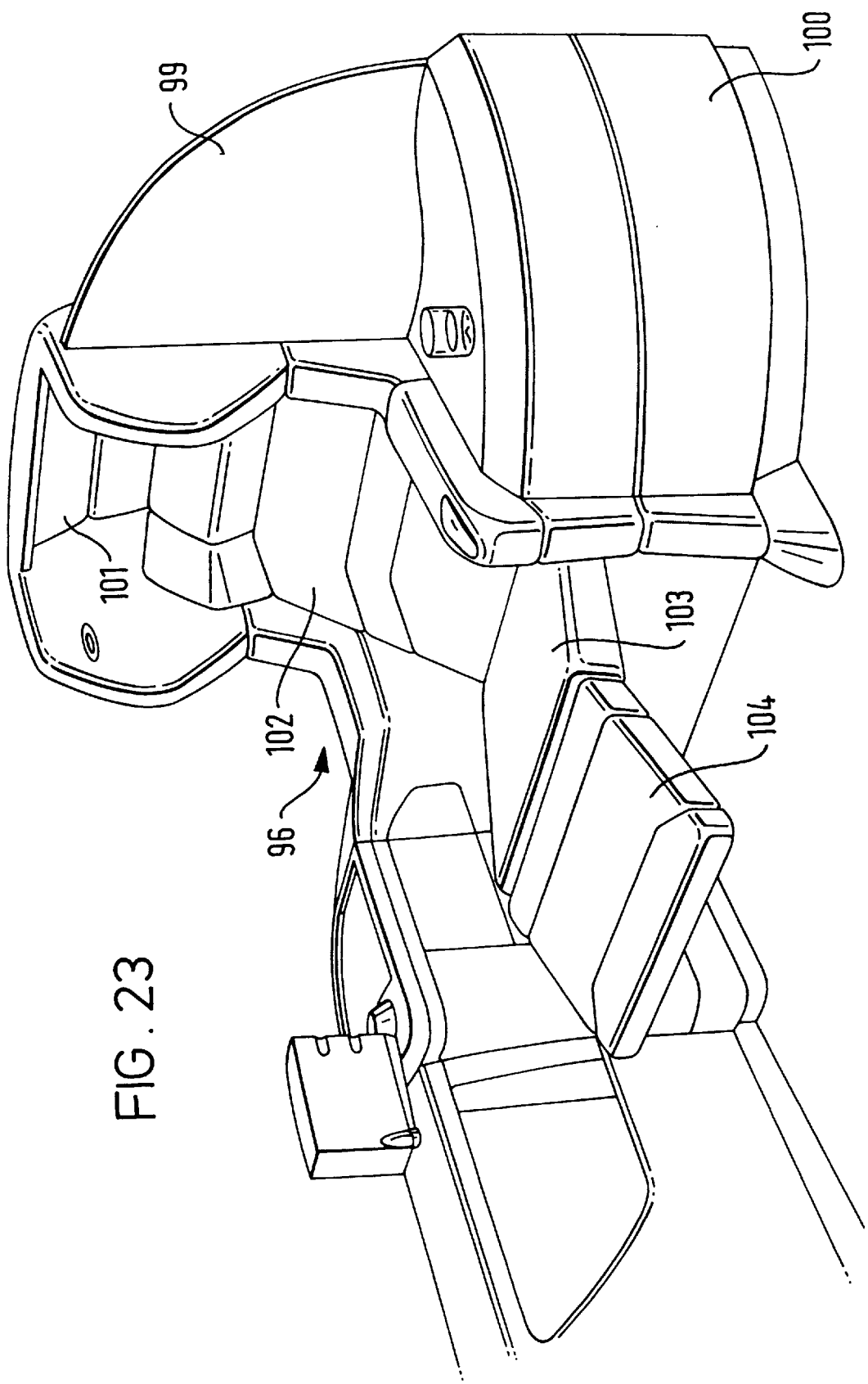
FIG. 23 is a second perspective view of the fifth accommodation unit.

While the echelon arrangement shown in FIGS. 3 and 4 if our co-pending application is preferred, other seating arrangements may, of course, be employed. FIG. 22 of the accompanying drawings shows an arrangement in which a central series of seats comprising pairs of units 90, 91, 92 is spaced along the central axis 93 of the cabin, and three individual units 94, 95, 96 and a single pair of units 97 are placed along each side of the cabin. A storage unit 98 is placed in front of the foremost central pair of units 90 for privacy. Similarly, a screen 99 is placed in front of the side pair of units 97 and beside the single seat 96 to provide privacy especially for the occupant of the seat 97a. The screen 99, which can be seen more clearly in FIG. 23, is placed behind a side console 100 beside the single seat 96 and is secured to the back of the shield 80 of that seat. More storage space may be provided in the side console 100 if desired.

It can be seen from FIG. 23 that the seat 96 is reclinable in a similar manner to the way in which the seating units shown in FIGS. 1 to 13 of our copending application and FIGS. 14 to 17 herein can recline. Like the previously described seats, the seat 96 comprises a fixed structure or housing 101 which houses a seat back portion 102, a seating portion 103 and a leg rest 104. Reclining of the seat is controlled by the occupant by way of a control panel 105 (see FIG. 20 for example) which controls actuation of motors and driving of shafts in a similar manner to that described hereinabove with reference to FIGS. 14 to 17.

Figure 24:
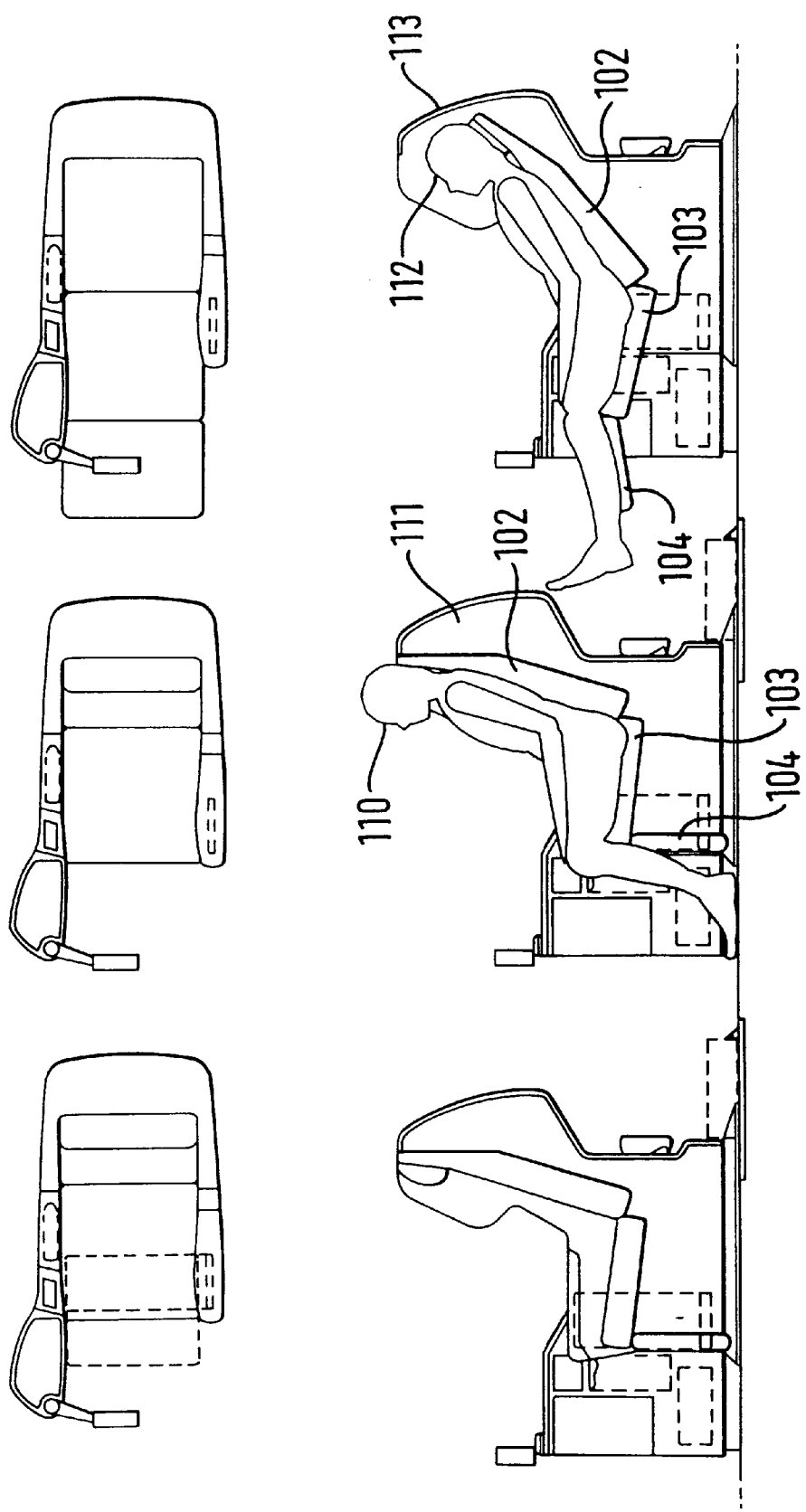
FIG. 24 shows side views and plan views of accommodation units in sitting and reclined positions.

The manner in which the seat 86 reclines can be seen clearly in FIGS. 24 and 25. In FIG. 24 a passenger 110 is shown sitting upright in a seat 111 and another passenger 112 is shown in a reclined position in another seat 113. In FIG. 25 a passenger 114 is shown sitting upright in a seat 115 and passengers 116, 117 are shown lying down in respective seats 118, 119.

As the seat 113 is reclined the back portion 102 moves into the housing 101. This is one reason why an overhang 86 is formed in the upper portion of the housing. As the back portion moves into the housing the seating portion 103 and leg rest 104 move forward out of the housing, the leg rest 104 moving up from the vertical to a more horizontal position. Continued reclining of the seat eventually results in the back portion 102, seating portion 103 and leg rest 104 arriving at the position of seats 118 and 119 in FIG. 25. In this position the back portion 102, the seating portion 103 and the leg rest 104 together form a substantially flat sleeping surface inclined to the plane of the aircraft by a small angle. The angle is not critical, but the steeper the angle the less space that is required between seating units. Research has shown that an angle of more than about 8° from the horizontal is uncomfortable because passengers feel that they will slip forward. Bearing in mind that most aircraft are pitched at 3° this means that an angle of approximately 11° can be employed.

With the seat in the sleeping position shown in FIG. 25 the feet of a tall passenger will reach into the space below the overhang of the seat in front. This is another reason for providing the overhang in each seating unit. The sleeping surface may be extended by providing on the seat in front a flip down extension unit 120 which cooperates (in a similar manner to the secondary seat in the embodiments shown in FIGS. 1 to 13 of our earlier application) with the leg rest 104.

The seating unit designs shown in FIGS. 19 to are aesthetically different than the designs of the seating units shown in FIGS. 11 to 13 of our earlier application but it will be appreciated from consideration of the foregoing that functionally the designs are very similar. Both designs provide desirable privacy for passengers. Both designs provide a reclining/sleeping seat which does not infringe the domain of other passengers in seats in front or behind when the seat is moved to a reclining/sleeping position. The use of screens can enhance further individual passenger's privacy. The provision of ancillaries in an off-seat arrangement as part of the seating unit reduces loading of the seat itself allowing more space within the seat to be given over to the passenger.

The seating unit designs shown in FIGS. 19 to 25 do not include a secondary seat and do not provide a substantially horizontal sleeping surface. Instead, a flip-down extension may be provided. Also, while the sleeping surface is flat, it is inclined at an angle to the horizontal. Both of the features reduce the amount of space required for each seating unit within an aircraft cabin, thereby enabling more units to be fitted into a given cabin space.

While FIG. 22 shows one arrangement of one design of seating units in an aircraft cabin, it will be appreciated that other designs may be placed in that arrangement, or other arrangements (such as the echelon arrangement) may be used with that design of seating unit. Features described in respect of one embodiment may, of course, be adapted for use in another embodiment, the selection of a given design and arrangement of features depending upon the type of aircraft in which the seating units are to be fitted, the nature of the flights and other factors well outside the ambit of the invention

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended-claims and equivalent thereof.

What is claimed is:

1. An aircraft accommodation unit comprising a seat and a cooperating unit different from the seat and positioned in front of the seat; the seat comprising;

a back portion;

a support for supporting said back portion to enable said back portion to be reclined between a substantially upright position and a substantially horizontal position, the degree to which said back portion is reclined being selectable by a user;

a seating portion;

a support for supporting said seating portion and arranged to allow said seating portion to move forward as said back portion is reclined and to move backward as said back portion is moved toward said upright position; and a leg support connected to move with said seating portion and positionable between a retracted position and an extended position forward of said seating portion;

the cooperating unit having an elevated surface adapted for cooperation with the seat to define a sleeping surface;

the seat and The cooperating unit being arranged so that with said back portion in said substantially horizontal position and said leg support in said extended position, said back portion, said seating portion, said leg support and said elevated surface of the cooperating unit together form a substantially flat and continuous surface constituting said sleeping surface.

2. The accommodation unit as claimed in claim 1, wherein the cooperating unit comprises a secondary seat positioned to face the seat.

3. The accommodation unit as claimed in claim 1, further comprising a privacy screen.

4. The accommodation unit as claimed in claim 1, further comprising a fixed housing containing the seat, wherein said back portion is reclinable in such a manner that it remains within said housing.

5. The accommodation unit as claimed in claim 4, wherein said fixed housing comprises storage space provided behind said back portion of the seat.

6. The accommodation unit as claimed in claim 1, further comprising a retractable table.

7. The accommodation unit as claimed in claim 1, further comprising a trolley for supporting said seating portion, said trolley comprising a member extending away from the seating portion to contact a supporting surface on which in use the accommodation unit is placed and thereby to support the seating portion, the trolley being connected to driving means for driving the trolley to move said seating portion forward and backward between a retracted position and an extended position, said seating portion and said back portion being connected such that as said seating portion is moved between said retracted and extended positions said back portion is caused to move between said substantially upright and substantially horizontal positions.

8. The accommodation unit as claimed in claim 7, wherein said back portion is connected at one end thereof to said seating portion.

9. The accommodation unit as claimed in claim 7, further comprising back guiding means for guiding said back portion between said substantially upright and substantially horizontal positions.

10. The accommodation unit as claimed in claim 7, further comprising seat guiding means for guiding said seating portion to vary the orientation thereof as said seating portion is moved between said retracted and extended positions.

11. The accommodation unit as claimed in claim 7, wherein said leg support is connected to moving means for moving the leg support between said retracted and extended positions independently of the driving of said trolley.

12. The accommodation unit as claimed in claim 11, wherein the moving means comprises an electric motor for driving said leg support.

13. The accommodation unit as claimed in claim 12, further comprising user operable control means for controlling said electric motor.

14. The accommodation unit as claimed in claim 7, wherein the driving means comprises an electric motor for driving said trolley.

15. The accommodation unit as claimed in claim 14, further comprising user operable control means for controlling said electric motor.

16. The accommodation unit as claimed in claim 1, wherein the cooperating unit is secured to the back of another seat.

17. The accommodation unit as claimed in claim 1, wherein the cooperating unit comprises a secondary seat.

18. The accommodation unit as claimed in claim 17, wherein said secondary seat comprises a fixed portion and a pivotable portion pivotable to avoid trapping of an object between the cooperating unit and said leg support as said leg support is moved between said retracted and extended positions.

19. The accommodation unit as claimed in claim 1, wherein the cooperating unit is pivotable to avoid trapping of an object between the cooperating unit and said leg support as said leg support is moved between said retracted extended positions.

20. The accommodation unit as claimed in claim 1, further comprising a utilities unit adjacent to and structurally separate from the seat for housing utilities for individual use by an occupant of the seat.

21. The accommodation unit as claimed in claim 20, wherein said utilities unit provides storage space for personal effects of the occupant.

22. The accommodation unit as claimed in claim 20, wherein said utilities unit contains a table extendible in front of the seat.

23. The accommodation unit as claimed in claim 22, wherein said utilities unit contains a table extendible in front of the primary seat.

24. The accommodation unit as claimed in claim 20, wherein said utilities unit is positioned to one side of the seat and the elevated surface and extends between said elevated surface and the seat.

25. The accommodation unit as claimed in claim 11, wherein a plurality of accommodation units are disposed in a cabin of an aircraft.

26. The accommodation unit as claimed in claim 25, wherein said plurality of accommodation units are arranged in an outboard-facing configuration.

27. The accommodation unit as claimed in claim 25, wherein said plurality of accommodation units are arranged in an inboard-facing configuration.

28. The accommodation unit as claimed in claim 1, wherein a plurality of said accommodation units are disposed in a cabin of an aircraft and wherein at least some of said plurality of accommodation units are arranged in an echelon.

29. The accommodation unit as claimed in claim 28, wherein a series of said plurality of accommodation units arranged in said echelon are disposed along each side of said cabin of said aircraft.

30. The accommodation unit as claimed in claim 29, wherein said series of said plurality of accommodation units arranged along each side of said cabin are oriented to face outwardly of said cabin.

31. The accommodation unit as claimed in claim 29, wherein said series of said plurality of accommodation units arranged along each side of said cabin are oriented to face inwardly of said cabin.

32. The accommodation unit as claimed in claim 28, wherein a series of said plurality of accommodation units is disposed in a central section of said cabin of said aircraft.

33. An aircraft accommodation unit comprising a seat and a co-operating unit different from the seat and positioned in front of the seat, the seat comprising:
   a back portion;
   a support for supporting said back portion to enable said back portion to recline between a substantially upright position and a substantially horizontal position;
   a seating portion;
   a support for supporting said seating portion and arranged to allow said seating portion to move between a seating portion retracted position and a seating portion extended position; and
   a leg support connected to move with said seating portion and positionable between a leg support retracted position and a leg support extended position forward of said seating portion, and
   the co-operating unit having an elevated surface adapted for co-operating with the seat to define a sleeping surface;
   the seat and co-operating unit being arranged so that with said back portion in said substantially horizontal position, said seating portion in said seating portion extended position and said leg support in said leg support extended position, said back portion, said seating portion, said leg support and said surface of the co-operating unit together form a substantially flat and continuous surface constituting said sleeping surface.

34. The accommodation unit as claimed in claim 33, wherein the co-operating unit comprises a secondary seat positioned to face the seat.

35. The accommodation unit as claimed in claim 33 further comprising a privacy screen.

36. The accommodation unit as claimed in claim 33 further comprising a fixed housing containing the seat, wherein said back portion reclines in such a manner that it remains within said housing.

37. The accommodation unit as claimed in claim 36, wherein said fixed housing comprises storage provided behind said back portion of the seat.

38. The accommodation unit as claimed in claim 33, wherein the co-operating unit is secured to the back of another seat.

39. The accommodation unit as claimed in claim 33, wherein the co-operating unit comprises a secondary seat.

40. The accommodation unit as claimed in claim 39, wherein said co-operating unit comprises a fixed portion and a pivotable portion pivotable to avoid trapping of an object between the co-operating unit and said leg support as said leg support is moved between said retracted and extended positions.

41. The accommodation unit as claimed in claim 33, wherein the co-operating unit is pivotable to avoid trapping of an object between the co-operating unit and said leg support as said leg support is moved between said retracted and extended positions.

42. The accommodation unit as claimed in claim 33, further comprising a utilities unit adjacent to and structurally separate from the seat for housing utilities for individual use by an occupant of the seat.

43. The accommodation unit as claimed in claim 42, wherein said utilities unit provides storage for personal effects of the occupant.

44. The accommodation unit as claimed in claim 42, wherein said utilities unit contains a television-type monitor.

45. The accommodation unit as claimed in claim 42, wherein said utilities unit contains a table extension in front of the seat.

46. The accommodation unit as claimed in claim 42, wherein said utilities unit is positioned to one side of the seat and the surface and extends between said surface and the seat.

47. The accommodation unit as claimed in claim 33, wherein a plurality of accommodation units are disposed in a cabin of an aircraft.

48. The accommodation unit as claimed in claim 47, wherein said pluarility of accommodation units are arranged in an outboard-facing configuration.

49. The accommodation unit as claimed in claim 47, wherein said plurality of accommodation units are arranged in an inboard-facing configuration.

50. The accommodation unit as claimed in claim 33, wherein a plurality of said accommodation units are disposed in a cabin of an aircraft and wherein at least some of said plurality of accommodation units are arranged in an echelon.

51. The accommodation unit as claimed in claim 50, wherein a series of said plurality of accommodation units arranged in said echelon are disposed along each said cabin of said aircraft.

52. The accommodation unit as claimed in claim 51, wherein said series of said plurality of accommodation units arranged along each side of said cabin are oriented to face outwardly of said cabin.

53. The accommodation unit as claimed in claim 51, wherein said series of said plurality of accommodation units arranged along each side of said cabin are oriented to face inwardly of said cabin.

54. The accommodation unit as claimed in claim 50, wherein a series of said plurality of accommodation units is disposed in a central section of said cabin of said aircraft.

* * * * *